United States Patent
Kalivas et al.

(10) Patent No.: US 10,657,413 B2
(45) Date of Patent: May 19, 2020

(54) RESTORATION OF DEFACED MARKINGS USING LOCK-IN INFRARED THERMOGRAPHY

(71) Applicant: IDAHO STATE UNIVERSITY, Pocatello, ID (US)

(72) Inventors: John Kalivas, Pocatello, ID (US); Rene Rodriguez, Pocatello, ID (US); Ikwulono David Unobe, Pocatello, ID (US); Lisa Lau, Idaho Falls, ID (US)

(73) Assignee: Idaho State University, Idaho Falls, ID (US)

( * ) Notice: Subject to any disclaimer, the term of this patent is extended or adjusted under 35 U.S.C. 154(b) by 0 days.

(21) Appl. No.: 16/365,832

(22) Filed: Mar. 27, 2019

(65) Prior Publication Data

US 2019/0303711 A1    Oct. 3, 2019

Related U.S. Application Data

(60) Provisional application No. 62/648,530, filed on Mar. 27, 2018.

(51) Int. Cl.
| | |
|---|---|
| *G06K 9/00* | (2006.01) |
| *G06K 9/62* | (2006.01) |
| *G06T 7/00* | (2017.01) |
| *H04N 5/33* | (2006.01) |

(52) U.S. Cl.
CPC ......... *G06K 9/6215* (2013.01); *G06K 9/6202* (2013.01); *G06K 9/623* (2013.01); *G06K 9/6247* (2013.01); *G06K 9/6288* (2013.01); *G06T 7/001* (2013.01); *H04N 5/33* (2013.01); *G06T 2207/10048* (2013.01); *G06T 2207/30136* (2013.01)

(58) Field of Classification Search
None
See application file for complete search history.

(56) References Cited

U.S. PATENT DOCUMENTS 8,577,120 B1    11/2013    Koshti

FOREIGN PATENT DOCUMENTS

| CN | 102034224 | 4/2011 |
| CN | 103530645 | 1/2014 |
| CN | 103778619 | 5/2014 |

OTHER PUBLICATIONS

Breitenstein, et al. "Lock-in Thermography: Basics and Use for Evaluating Electronic Devices and Materials" *Springer Science & Business Media* (2003) pp. 29-32.

(Continued)

*Primary Examiner* — Atiba O Fitzpatrick
(74) *Attorney, Agent, or Firm* — Dority & Manning, P.A.

(57) ABSTRACT

Methods for identifying marks in a defaced metal surface by use of computer-implemented processing of images obtained according to a thermal lock-in imaging technique are described. Methods include processing phase images and/or amplitude images according to principal component analysis of a concatenated input matrix and development of a score image for each principal component determined by the analysis. Score images or extracted features of score images (e.g., Zernike moments) are compared to images/features in a reference data library and based upon the comparison, the defaced mark can be identified.

20 Claims, 20 Drawing Sheets

(56) References Cited

OTHER PUBLICATIONS

Brownfield, et al. "Consensus outlier detection using sum of ranking differences of common and new outlier measures without tuning parameter selections" *Anal. Chem.* 89 (2017) pp. 5087-5094.

Choi, et al. "Quantitative determination of a subsurface defect of reference specimen by lock-in infrared thermography" *NDT & E Intl* 41(2) (2008) pp. 119-124.

Cramer, et al. "Quantitative thermal imaging of aircraft structures" *Intl Soc Optics Photonics* 2473 (1995) pp. 226-233. (Abstract only).

Geladi, et al. "Multivariate image analysis" *Encyclopedia of Analytical Chemistry* (1996). (Abstract only).

Heberger, et al. "Sum of ranking differences for method discrimination and its validation: comparison of ranks with random numbers" *J. Chemom.* 25 (2011) pp. 151-158. (Abstract only).

Jackson, J.E. "A user's guide to principal components" *BMDP Statistical Software, Inc.* (1991) pp. 1-51.

Killey, et al. "Analysis of thermal nondestructive testing" *J Phys D: Appl Physics* 22(1) (1989) pp. 216-224.

Kuppuswamy, R. "Metallographic etching of aluminium and its alloys for restoration of obliterated marks in forensic science practice and investigations" *Aluminium Alloys, Theory and Application* (2011) pp. 331-352.

Lakshiminarayanan, et al. "Zemike polynomials: A Guide" *J Mod Opt.* 58(7) (2011) pp. 545-561.

Liu, et al. "Effect of modulation frequency on detecting defects of metal plates using infrared lock-in thermography" 7283 *Intl Soc Optics Photonics* (2009). (Abstract only).

Nickolls, L.C. "Erased identification marks" *The Scientific Investigation of Crime* (1956).

Peeler, et al. "The Restoration of Impressed Characters on Aluminum Alloy Motorcycle Frames" *J Forensic Identification* 58(1) (2008) pp. 27-32. (Abstract only).

Polk, et al. "Metallurgical aspects of serial number recovery" *AFTE J* 21(2) (1989) pp. 174-181.

Ranjit, et al. "Detection of subsurface defects in metal materials using infrared thermography; image processing and finite element modeling" *J Korean Soc Nondestr Testing* 34(2) (2014) pp. 128-134.

Sayers, C.M. "Detectability of defects by thermal non-destructive testing" *Brit J Non-Destr Testing* 26(1) (1984) pp. 28-33.

Teh, et al. "On image analysis ley the methods of moments" *IEEE Trans. Pattern Anal. Mach. Intell.* 10 (1988) pp. 496-513.

Unobe, et al. "Potential of Lock-In Infrared Thermography for the Recovery of Defaced Serial Numbers" *Research Cell* 16 (2016) pp. 68-74.

Wightman, et al. "Restoration of stamp marks on steel components" *Forensic Sci Internl* 180(1) (2008) pp. 32-36.

Willet, P. "Combination of similarity rankings using data fusion" *J Chem Inf Model* 53(1) (2013) pp. 1-10.

Wilson, P.B. "The restoration of erased serial identification marks" *Police J* 52(3) (1979) pp. 233-242.

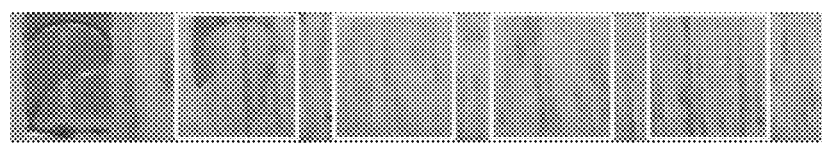
FIG. 11
FIG. 12
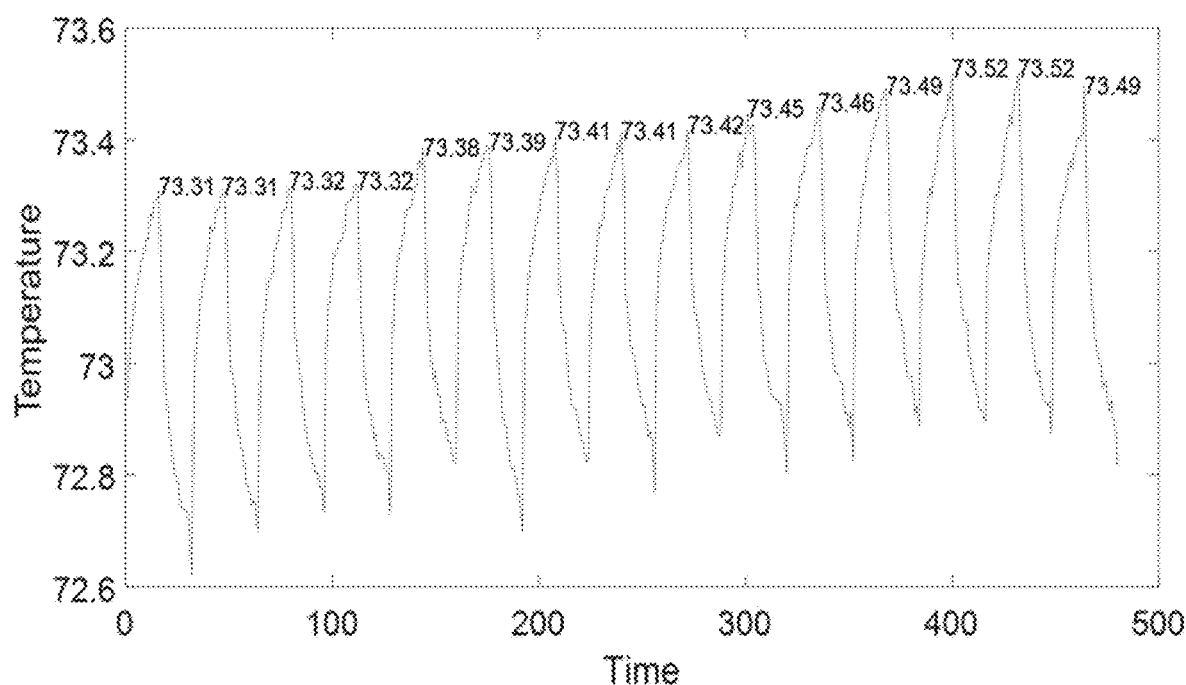
FIG. 13

RESTORATION OF DEFACED MARKINGS USING LOCK-IN INFRARED THERMOGRAPHY

CROSS REFERENCE TO RELATED APPLICATION

This application claims filing benefit of U.S. Provisional Patent Application Ser. No. 62/648,530, having a filing date of Mar. 27, 2018, entitled "Restoration of Defaced Serial Numbers Using Lock-In Infrared Thermography," which is incorporated herein by reference for all purposes.

FEDERAL RESEARCH STATEMENT

This invention was made with Government support under Grant Nos. 2013-R2-CX-K012 and 2015-R2-CX-0017, awarded by the National Institute of Justice. The Government has certain rights in the invention.

BACKGROUND

Marks formed in metal surfaces, such as stamped marks and engraved marks (e.g., laser engraved marks), a prior art example of which is illustrated in FIG. 1 100, provide a means of unique identification for many items including firearms and automobiles. Unfortunately, marks are regularly defaced 110 for criminal activities. However, the marking of the metal surface, e.g., the stamping or engraving process, causes a permanent change in shape of the surrounding metal 102, primarily due to the inability of regions of crystalline arrangement within localized grains to resist the induced stress of stamping, melting, etc., leading to an alteration of the structure and by extension, the interlocking grain boundaries. This resulting deformation extends to some depth below the mark and is known as the zone of plastic strain 104. This area has physical and chemical properties that differ from those of the surrounding non-stamped metal due to the changes in its microstructure.

Many approaches leveraging on these structural features have been developed in an attempt to recover obliterated serial numbers. One widely used approach is chemical etching. This process utilizes the change in chemical potential that makes the defaced area more reactive to acids and thereby allowing for recovery of the defaced number 106 within the zone of plastic strain 104. Chemical etching, however, is a highly controlled and destructive recovery process that requires delicacy and some expertise in applying and removing the etchant. Additionally, because it is a destructive method, the test can only be run once and the test specimen is permanently altered. This shortcoming is the impetus for developing non-destructive, reproducible methods of defaced serial number identification.

A non-destructive approach that has been examined for the detection of defects in metals is infrared thermal imaging. This method seeks to locate and characterize flaws by measuring their effect on heat flow through the material under controlled conditions by observation of the propagation of applied thermal energy. Local regions of plastic strain can be detected as the temperature gradient therein will differ from the rest of the surface due to the local change in thermal conductivity. However, the data acquired through thermographic imaging techniques can be noisy due to undesired signals from several factors including unevenly heated surfaces, radiation from the heated surface and local emissivity variations.

What are needed in the art are methods for recovering defaced marks in metal surfaces. Non-destructive methods that can consistently recover defaced marks in metal surfaces with high confidence would be of great benefit.

SUMMARY

Disclosed are methods for identifying marks in a defaced metal surface with high confidence. Disclosed methods can include computer-implemented processing of images obtained according to a thermal imaging approach.

In one embodiment, a method can include obtaining a plurality of infrared thermal images of a defaced area on a metal surface by use of a lock-in thermal imaging system. For instance, the plurality of images can include phase images, amplitude images, or both. A method also includes utilizing a computing system to combine data of the phase images and/or amplitude images thus obtained to form an input matrix for the defaced area. For instance, a matrix describing a single phase image or amplitude image, each entry of which includes data from a pixel, can be unfolded and concatenated as a single column of an input matrix for the defaced area. A principal component analysis (PCA) can then be carried out on the input matrix, and a score image constructed for each principal component (PC) obtained from the PCA of the input matrix. Each score image is a reconstruction of a single principal component vector into an image. The score images thus obtained can display the variability in intensity of the different pixels over time during the thermal imaging. One or more of these score images can then be compared to images in a reference data library and based upon the comparison, the defaced mark can be identified, for instance as a single number of a serial number.

In one embodiment, the step of comparing a score image to images of a reference library can include comparison of features that have been extracted from the score image via orthogonal moments, rather than comparing the actual score images. For example, Zernike moments or pseudo Zernike moments can be extracted from the score images. The vectors thus obtained can then be compared to vectors similarly obtained from the reference library data by application of a plurality of similarity measures. The similarity values obtained by application of the similarity measures can then be used to identify the defaced mark, for instance through data fusion of the similarity values for each potential mark followed by ranking the results, e.g., according to a majority vote, a sum rule, or a combination of ranking methodologies.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which:

FIG. 11 illustrates a stainless steel plate carrying stamped numbers prior to defacing of the numbers.

FIG. 12 illustrates the stainless steel plate following defacing of the numbers.

FIG. 13 presents a mean temperature-time plot across a defaced surface over the course of obtaining a plurality of thermographic images.

Figure 1:
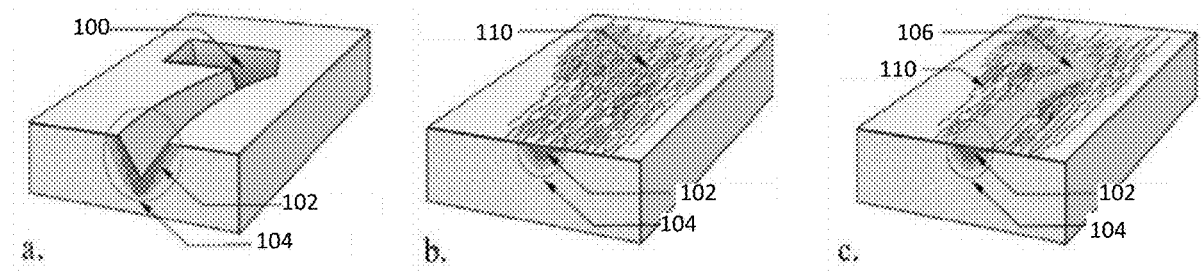
FIG. 1 schematically illustrates a prior art image illustrating a defaced surface and an overlay of an ideal restored image on the defaced surface.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In general, disclosed are non-destructive methods for identification of marks in defaced metal surfaces. More specifically, disclosed methods utilize thermal imaging combined with computer-implemented data processing so as to provide mark identification with high confidence in a non-destructive identification approach. Beneficially, the systems and methods of the present disclosure provide a number of technical effects and benefits. Existing techniques for identifying defaced marks focus on destructive techniques such as chemical etching or low confidence non-destructive techniques such as thermal imaging that have limited success due to high signal to noise ratios. In contrast, the present disclosure provides a highly-effective, non-destructive approach for identifying defaced marks in metal surfaces. Thus, the systems and methods of the present disclosure have a technical effect of permitting identification of defaced marks without destroying the sample to be identified and can do so with much higher confidence than was possible with previous non-destructive approaches.

In addition, the systems and methods of the present disclosure are directed to a practical application of computing technology. In particular, various specific technical implementations of computerized systems and methods are described herein which are practically applied to the specific tasks of identification of defaced marks in metal surfaces. Thus, example embodiments of the present disclosure are directed to a particular technological environment and field of technology such as the evaluation of defaced metal surfaces based on lock-in thermal imaging.

Disclosed methods utilize infrared thermal imaging as the basis for the non-destructive analysis. As mentioned previously, however, thermal imaging as has been utilized in the past in an attempt to examine defects in metal surfaces can have a large signal to noise ratio, and thus, has not been effective for determination of defaced marks. Disclosed methods mitigate these effects is by using a lock-in infrared thermography technique to develop a plurality of images of a defaced area and then processing data obtained from the images to positively identify a defaced mark.

Figure 2:
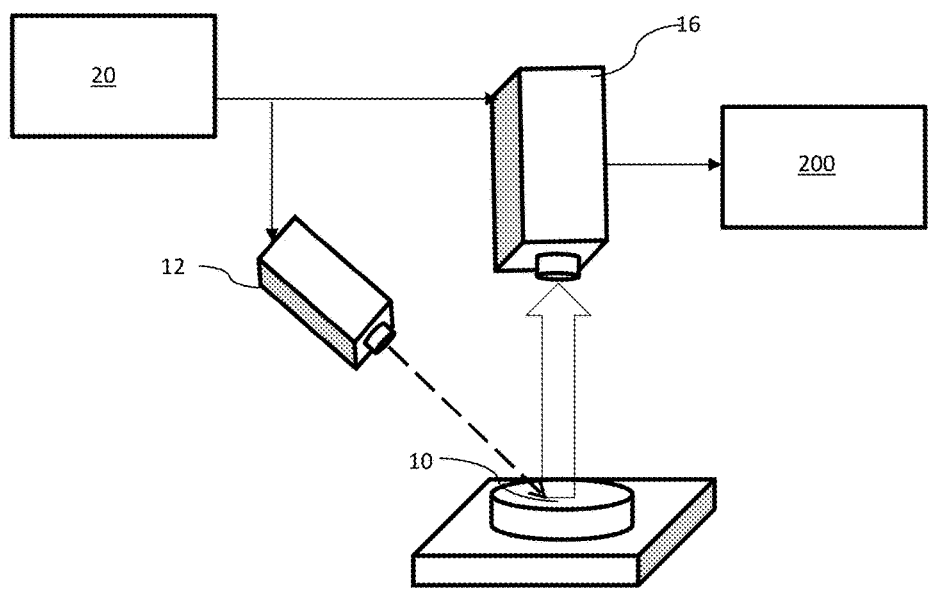
FIG. 2 schematically illustrates a typical lock-in thermography method and system.

FIG. 2 schematically illustrates one embodiment of a lock-in thermography system as can be utilized. Lock-in thermography can include inducing sinusoidal energy waves into the surface of a sample 10 at a defined frequency (lock-in frequency), for instance by use of a pulsed laser 12, and collecting infrared thermal images of the sample surface 10 over the entire period of the pulsed wave by use of an IR camera 16. The modulation frequency of the induced energy and the image collection can be correlated, for instance by use of a control system 20 as is known in the art.

The modulation frequency used and the frame rate utilized in collecting the initial thermal images of a sample are not particularly limited. For instance, when imaging a surface in which heat propagates irregularly through the plastic deformation areas below the stamped numbers and propagation of the heat through non-deformed areas is more regular then over the course of several heat pulses, differences in the thermal images between the irregular propagation in the deformed areas and the regular propagation in the non-deformed can be increased by including more pulses and/or more frames per pulse cycle.

In some embodiments, it may be beneficial to obtain the raw thermal image data at a plurality of different modulation frequencies. Testing across several modulation frequencies can be carried out in some embodiments as the depth of penetration for flaw characterization in a material can be inversely proportional to the modulation frequency. Thus, while it may be possible to identify shallower defects by use of thermal images obtained at higher frequencies, deeper flaws may beneficially utilize lower modulation frequencies in order to be captured suitably for high confidence identification. Utilizing a plurality of modulation frequencies can thus allow for investigating a range of depths within a material and thereby determine the best depth at which a defaced mark can be most clearly identified, as this depth can vary with respect to the method used in originally applying the mark as well as the material and the degree of defacing.

In any case, upon obtaining a plurality of thermal images by use of a lock-in thermography system, data from the IR camera 16 can be collected 200 for processing.

Figure 3:
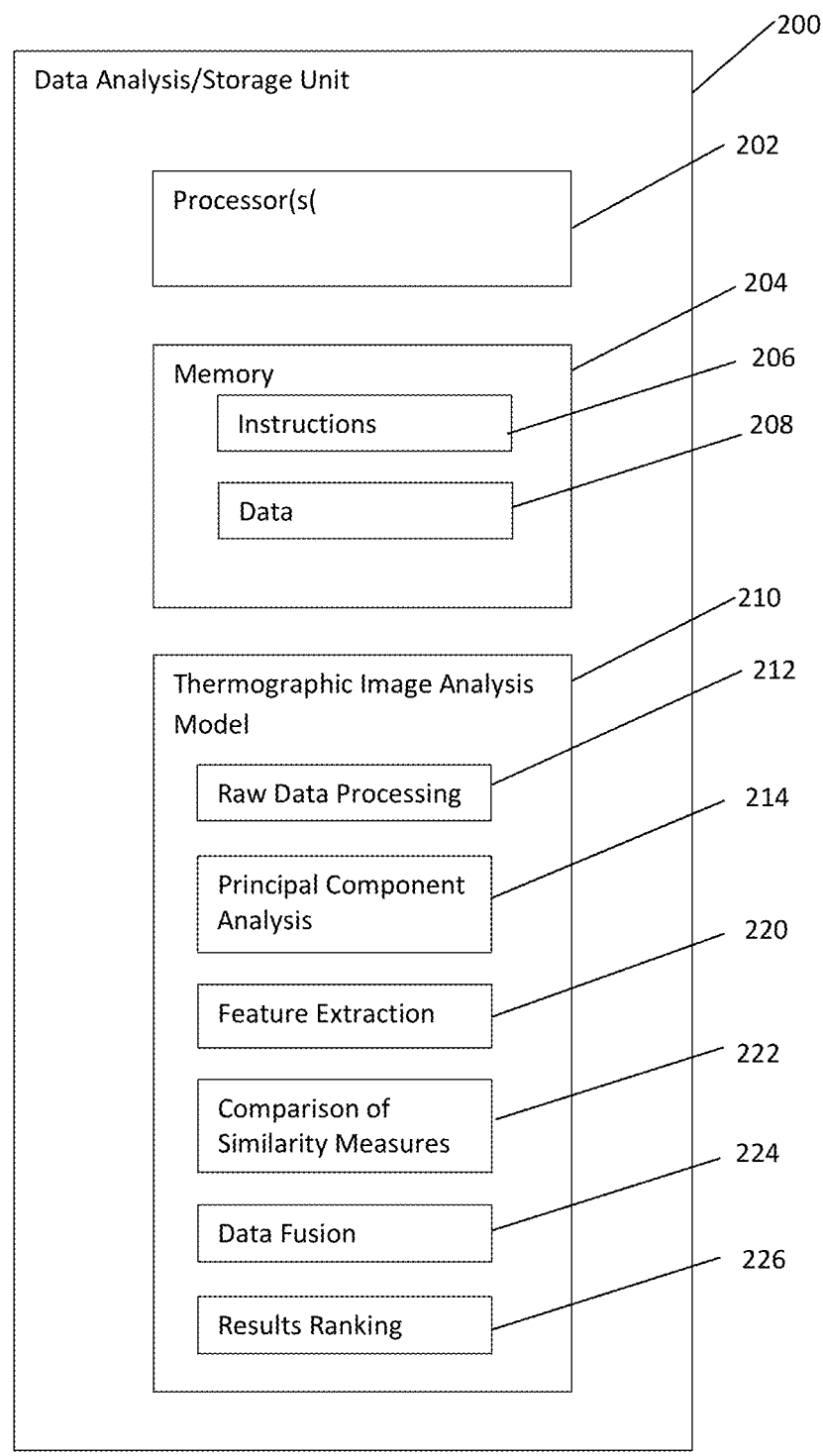
FIG. 3 illustrates an exemplary system for carrying out data manipulation and image identification methods as described herein.

In general, data processing, analysis, storage, etc. can be carried out by use of a computer system. FIG. 3 depicts an exemplary analysis unit 200 according to an exemplary embodiment of the present disclosure. Data analysis/storage unit 200 can be used in any mark identification process. Moreover, methods as disclosed herein are not limited to use of only a single data analysis unit 200. For instance, in one embodiment, a first data analysis unit can be utilized in raw data processing of thermographic images, and a second, separate unit can be utilized in analysis of those images and identification of a defaced mark.

A data analysis/storage unit 200 can include one or more processors 202 and a memory 204. The processor(s) 202 can be any suitable processing device, such as a microprocessor, microcontroller, integrated circuit, or other suitable processing device, including a combination of discrete analog and/or digital logic circuitry (such as switches, amplifiers, integrators, comparators, flip-flops, AND gates, and the like) to perform control functionality.

The memory 204 can include any suitable computing system or media, including, but not limited to, non-transitory computer-readable media, RAM, ROM, hard drives, flash drives, or other memory devices. The memory 204 can store information accessible by processor(s) 202, including instructions 206 that can be executed by processor(s) 202. The instructions 206 can be any set of instructions that when executed by the processor(s) 202 cause the processor(s) 202 to provide desired functionality. Memory 204 can further store data 208. Data 208 can be any form of data, including reference data for use in a defaced mark identification protocol that can be stored for later transmission or utilization.

In one embodiment, a data analysis/storage unit 200 can include a thermographic image analysis model 210 that can be utilized to identify a defaced mark. A model can be used to process raw data 212 of a plurality of thermal images, for instance data as can be obtained directly from an IR camera as illustrated in FIG. 2. As discussed further herein, a thermographic image analysis model 210 can include further components, examples of which can include, without limitation, a PCA component 214, a feature extraction component 220, a component for comparison of similarity measures 222, a data fusion component 224, and a results ranking component 226.

Upon collection of a plurality of infrared thermal images of a sample surface 10 over the entire period of a pulsed wave, the raw data can be digitally processed 212 according to the lock-in principle. For instance, a thermographic image sequence can be analyzed and compressed into an amplitude image and a signal phase image. In general, raw data processing 212 can include suppression of undesired surface features of the phase and amplitude images, making them more robust than raw thermal images for analyzing subsurface features. For instance, a standard normal variate can be incorporated in a raw data processing protocol to remove light scatter effects.

According to one embodiment, thermal images can be processed using a two-channel image correlation to develop an amplitude image A, and a signal phase image φ using Equations 1 to 4:

$$S^{0°} = \frac{1}{k}\sum_{i=1}^{k} 2 * \sin(t) * F(i) \tag{1}$$

$$S^{-90°} = \frac{1}{k}\sum_{i=1}^{k} -2 * \cos(t) * F(i) \tag{2}$$

$$A = \sqrt{(S^{0°})^2 + (S^{-90°})^2} \tag{3}$$

$$\phi = \tan^{-1}\left(\frac{-S^{-90°}}{S^{0°}}\right) \tag{4}$$

where k is the number of frames per lock-in period, F(i) is the $i^{th}$ thermal image collected by an infrared camera, $$t = \frac{2\pi(i-1)}{k},$$

sin(t) and cos(t) are weighing factors and $S^{0°}$ and $S^{-90°}$ are the in-phase and quadrature signals respectively.

Alternatively, a phase image can be developed by inverting the in-phase and quadrature signals as shown in Equation 5.

$$S^{0°/-90°} = \frac{S^{0°}}{S^{-90°}} \quad (5)$$

The image formed using this inverted equation can be preferred in some embodiments, as it can provide improved spatial resolution while maintaining the emissivity corrected property of phase images. In general, when it is suspected that the thermal gradient differences are very small, using this image can improve contrast, and thus enhance mark recovery.

In some embodiments, it may be preferred to use the fourth power instead of the square of the in-phase and quadrature signals. This can reduce the effects of the emissivity multiplier for each signal and can improve the output image.

A major drawback of using lock-in thermography alone is the presence of blind frequencies (i.e., pulsing frequencies at which the contrast between clean areas and defective areas is minimal). Defect detection in phase images developed at these frequencies is usually difficult, and thus, such frequencies need to be avoided. To address this shortcoming, phase difference plots can be developed to determine the best test frequencies for collecting data. This can be done by calculating phase images at several frequencies and determining the phase differences between defaced and non-defaced areas of a surface. The frequencies at which these differences are maximized can then be utilized for the remainder of an identification protocol.

In one embodiment, raw data processing of the thermal images obtained according to a lock-in thermography process can include filtering using a moving average filter to enhance the contrast between pixels by averaging the value of pixels in a rectangle of specified length and width (e.g., 12 pixels by 12 pixels) around a particular pixel and replacing its intensity value with the average. The window size is not particularly limited and can be chosen as desired to improve results. For instance, a window size can be selected so as to represent about half of the pixel number that spans the width of an expected mark area. At the edges, the window can be taken with the entire length and/or width of the rectangle on the inward side. This window can increase as the number of pixels closest to the edge increases until the full length can be used on all sides.

Following initial processing of the raw thermographic data, multivariate image analysis (MIA) can be carried out. MIA is a computational process that allows for the examination of collected data to help with detection and analysis of possible variations within the data.

Figure 4:
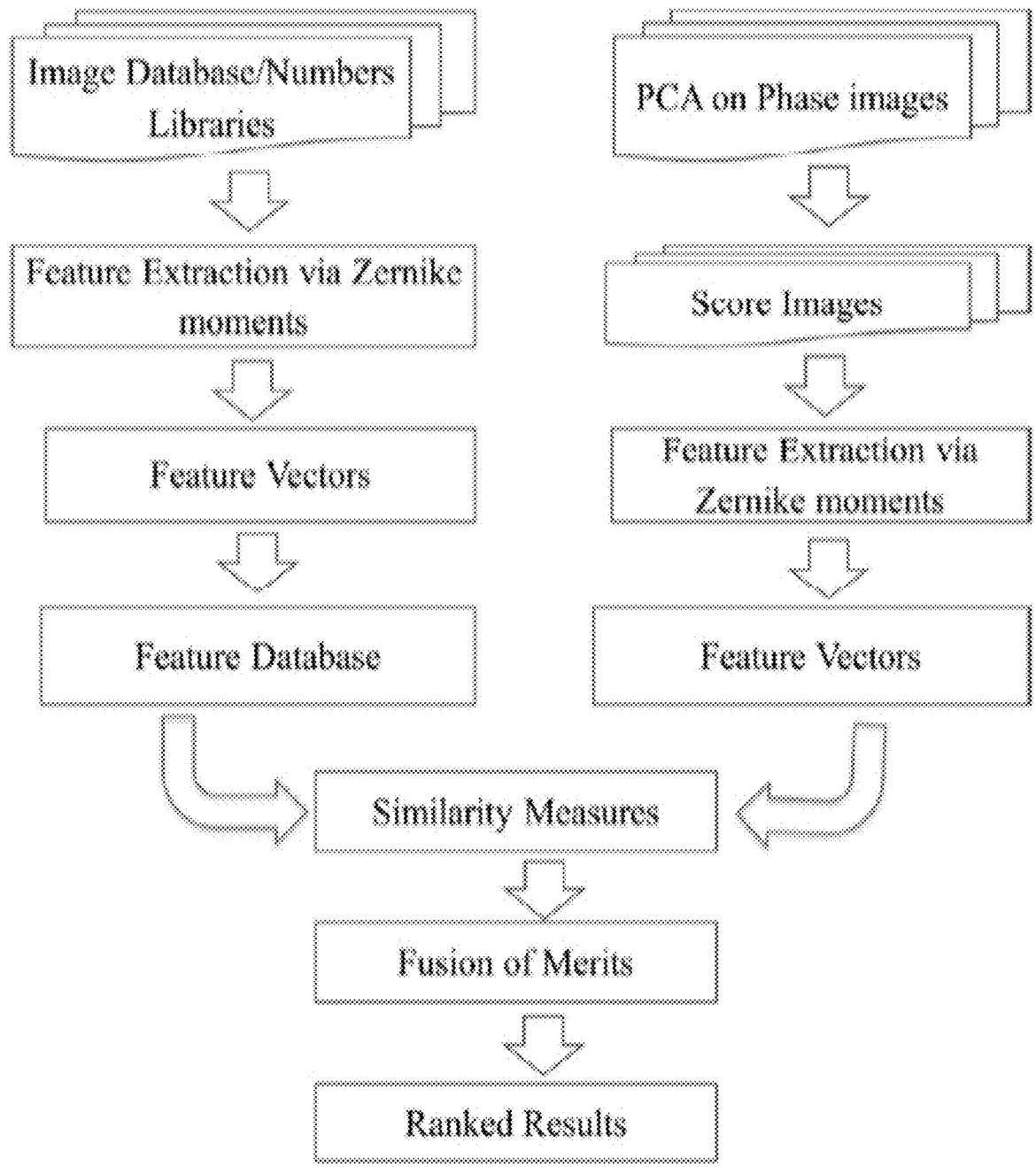
FIG. 4 illustrates an exemplary approach for carrying out an image identification process.

FIG. 4 presents a flow diagram for one analysis approach including MIA as may be utilized in identifying a defaced mark. As illustrated, in this particular embodiment, a method can include PCA of phase image data obtained from processing raw thermographic images. However, it should be understood that disclosed methods are not limited to analysis of phase images and, as discussed previously, amplitude images may alternative or additionally be utilized. For instance, although identical in the process of developing, there can be some differences in the amplitude and phase images developed from thermal images collected over succeeding periods. The transient flow of thermal energy over time through the sample can cause changes in the phase shift in different cyclic periods until thermal equilibrium is achieved. Accordingly, each developed amplitude and phase image can be unique in the degree of phase shift between defaced and clean areas. Several amplitude and phase images covering different periods can thus be utilized to capture this changing phenomenon and data analysis including PCA can leverage these changes to reproduce the defaced mark from the zone of plastic strain.

PCA is a mathematical procedure that utilizes an orthogonal transformation to convert a set of observations of possibly correlated variables, such as the set of vectors representative of a phase image, to a set of values of linearly uncorrelated variables termed principal components. The number of principal components is less than or equal to the number of original variables. The transformation is defined so that the first principal component has the largest possible variance and each succeeding component has, in turn, the highest variance possible under the constraint that it be orthogonal to, that is, uncorrelated with, the preceding components.

According to one embodiment, PCA can be carried out on an input matrix that is a collection of filtered phase or amplitude images (generally referred to herein as input images) processed from the respective thermal image sequences captured using the infrared camera.

Figure 5:
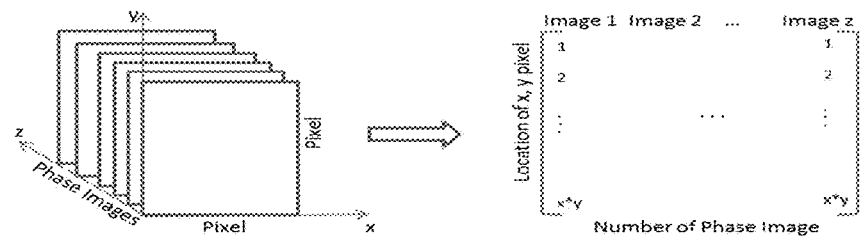
FIG. 5 schematically illustrates the unfolding of a plurality of images (phase images in this embodiment) to form an input matrix for a principal component analysis (PCA) process.

In order to carry out PCA on an input matrix the following steps can be carried out:

Each input image is unfolded (row-wise or column-wise) and concatenated as a single column of a new representative matrix X as shown in FIG. 5.

The covariance matrix C is determined for the representative matrix.

The eigenvectors (V) and their corresponding eigenvalues (E) are determined for the covariance matrix.

Each eigenvector (v) multiplies the representative matrix X to develop a score vector which captures a percentage of the variance within the original images given in its corresponding eigenvalue.

Each principal component score is then folded into a score image (FIG. 4) to visualize the information captured as a linear combination across the images.

In projecting the input images into orthogonal directions, each principal component captures variation across the phase or amplitude images. Among these variations is the change in the rate of heat propagation between the defaced areas and clean areas, which may appear as subtle signatures in the input images. These variations, largely identical in defaced areas, are mainly captured by a single principal component, independent of other linear variations across the phase images.

As indicated in FIG. 4, the principal components resulting from PCA can be formed into score images that are of the same spatial dimensions as the original images. Beneficially, the score images can provide a visual representation of the information retained in respective principal components. By developing a series of score images from the principal components, a unique thermal gradient of the zone of plastic strain across the thermal images can be identified and clustered, which can improve identification of the defaced number.

In general, the score images thus obtained, while characterizing the zone of plastic strain, do not have the visual quality to allow for objective identification of the defaced mark. As such, comparison of the score images with reference images can provide a route to identification of defaced marks. However, direct comparisons between score images of defaced marks and library images of representative marks come with a number of challenges including image size differences, as well as possible translation, scale and rotation differences between the images being compared.

These challenges can be overcome by comparing image features extracted from the score images via orthogonal moments, in lieu of direct comparison of the score images. In one embodiment, Zernike moments or pseudo Zernike moments can be used to characterize the score images into vectors of a predetermined size (FIG. 4). Invariant to rotation, Zernike and pseudo Zernike moments have been shown in other applications to outperform other orthogonal moments as a global shape descriptor for object classification and retrieval. However, feature extraction from score images are not limited to pseudo Zernike moments or Zernike moments, and other orthogonal moments can alternatively be used. Examples of other moments as may be utilized for feature extraction can include, without limitation, wavelet moments, Krawtchouk moments, Tchebichef moments, general orthogonal moments, Legendre moments and Jacobi Fourier moments.

In one embodiment, all score images developed for a defaced mark area can be evaluated irrespective of whether or not any image can visually be estimated from a score image. Using all score images can avoid the necessity of preselecting one or a limited number of score images for further processing/examination and ensures that parts of a defaced mark that may be partially reproduced in a range of score images are all utilized in making an identification. However, while all score images can be subjected to feature extraction in some embodiments, in other embodiments, only those score images that present a unique thermal gradient indicative of a zone of plastic strain as compared to other score images can be further processed. For instance, only a single score image that demonstrates a relatively large intensity contrast localized around a section where a defaced mark is believed to have existed can be selected for further processing.

In one embodiment, prior to feature extraction from the PCA score images, the score images can be pre-processed to more clearly parallel the images of the reference data base. For instance, in those embodiments in which a reference data base (or elements of a reference data base) are black and white images and the PCA score images include a plurality of different colors, the PCA score images can be processed into binary black and white images to parallel the black and white reference images. A binarization process can involve selecting an optimal threshold of pixel intensities to best separate background from object pixels. This threshold can be selected for each individual image iteratively by using an initial assumption of the four pixel mean intensity from each corner of respective score images. The mean value of pixels above this initial threshold (assumed to represent objects within the image) and those equal to or below the threshold (assumed to be represent the background) are separately calculated and then averaged together. This average value is used as a new threshold. This iterative process continues until there is no change in the determined threshold. The corresponding score image can then be binarized with respect to the threshold, e.g., with 1 for above the threshold as white and 0 for below being black.

Computation of Zernike moments for images (e.g., binarized images) can include four steps: preprocessing the score image to make it scale and translation invariant, computation of radial polynomials, computation of Zernike basis functions (Zernike polynomials) and computation of Zernike moments by projecting an image onto the Zernike basis functions.

Preprocessing a score image to make it scale and translation invariant can include normalizing the image using its regular moments according to methods generally known in the art (see, e.g., Teh, et al., IEEE Trans. Pattern Anal. Mach. Intell. 10 (1988) 496-513).

Scale invariance can be achieved by altering the object size such that its area (pixel count for binary images) is set to a predetermined value ($\beta$). This value resizes the object in the image, either increasing its size or reducing it with respect to its original area and needs to be determined empirically to ensure that the entire object still lies within the image and is large enough to be discernable. By way of example, the $\beta$ value can be set to 5000. Scale invariance is achieved by Equations 6 and 7.

$$g(x, y) = f\left(\frac{x}{a}, \frac{y}{a}\right) \tag{6}$$

$$a = \sqrt{\frac{\beta}{m_{00}}} \tag{7}$$

where (x, y) are the pixel coordinates of each pixel in the image, $m_{00}$ is the area (pixel count for binary image) and g(x, y) is the invariant image pixel coordinates.

Translation involves moving the center of mass of the object in the image to the center of the image. This can be achieved as shown in Equation 8.

$$h(x,y)=g(x+\bar{x},y+\bar{y}) \tag{8}$$

where h(x, y) is the translation invariant image pixel coordinates and ($\bar{x}$, $\bar{y}$) is the centroid of the object (all pixels with intensity value of 1) in the binary image.

Zernike basis functions and consequently Zernike moments can then be developed from these normalized images.

Computing the Zernike basis functions and subsequent Zernike moments for an image includes mapping the image to reside in a unit circle with the origin at the center of the image. Pixels outside a unit circle are not used in computing the moments. Thus, to ensure that all score and library image pixels are captured within the unit circle, the entire binary image is resized into a larger square image of dimensions with each side equal to $2(n_x^2+n_y^2)^{1/2}$ where $n_x$ and $n_y$ are respectively one half of the number of x and y pixels. This larger image is padded on each side of the original image with pixels with intensity 0 for black to create a new image of the larger dimensions.

The polar value $\rho$ and corresponding polar angle $\theta$ for any pixel (x, y) in polar coordinates is calculated as:

$$\rho = \sqrt{\left(\frac{x-\bar{x}}{d}\right)^2 + \left(\frac{y-\bar{y}}{d}\right)^2} \tag{9}$$

$$\theta = \tan^{-1}\left(\frac{x-\bar{x}}{y-\bar{y}}\right) \tag{10}$$

where (x, y) are the pixel coordinates of each pixel for the square image, ($\bar{x}$, $\bar{y}$) are the pixel coordinates of the center of the image and d is half the dimension of the image.

Equations 9 and 10 map each pixel coordinates to the unit circle in polar. The radial polynomials ($R_{nm}(\rho)$) necessary for the determination of the Zernike basis polynomials is calculated using the polar value $\rho$ and defined order n as shown in Equation 11:

$$R_{nm}(\rho) = \sum_{s=0}^{n-m/2} (-1)^s * \frac{(n-s)!}{s!\left(\frac{n+|m|}{2}-s\right)!\left(\frac{n+|m|}{2}-s\right)!} * \rho^{n-2s} \qquad (11)$$

where n is a number of basis polynomials that define the order of Zernike moments, m is a positive or negative integer bound by the constraints n−|m|=even and |m|≤n.

The Zernike basis functions (polynomials) and the corresponding moments are determined from these real valued polynomials and the input images using Equations 12 and 13:

$$V_{nm}(x, y) = V_{nm}(\rho, \theta) = R_{nm}(\rho)\exp(jm\theta) \qquad (12)$$

$$A_{nm} = \frac{n+1}{\pi}\sum_{x=1}^{N}\sum_{y=1}^{N} f(x, y)V_{nm}^*(\rho, \theta); x^2 + y^2 \le 1 \qquad (13)$$

where $V_{nm}$ is the Zernike polynomial, $A_{nm}$ is the Zernike moment, f(x, y) is the intensity value of an image pixel with coordinates x, y, $j=\sqrt{-1}$ and $V_{nm}^*(\rho, \theta)$ is the complex conjugate of $V_{nm}(\rho, \theta)$.

The Zernike moment vectors are developed by concatenating the Zernike moments ($A_{nm}$) at each order into a single vector.

An image pixel can be recreated using the Zernike basis polynomial and the Zernike moments up to the defined order as shown in Equation 14.

$$\hat{f}(x,y)=\sum_{n=0}^{n}\sum_{m=0}^{n}A_{nm}V_{nm}(\rho,\theta) \qquad (14)$$

where $\hat{f}(x, y)$ is a reconstructed pixel in the translated (centered) representation. The pixels added previously to ensure the original image is inscribed in a unit circle are removed leaving the reconstructed image of the same size as the original image.

The process of extracting Zernike moments requires the definition of a finite order of Zernike basis (n) to be used in extracting Zernike moments from an image. Higher order Zernike moments are more susceptible to noise and thus undesirable for image representation. Conversely, higher number moments also better capture the finer details of an image and cannot totally be discarded. As such, an identification method can include determination of an order of moments that will both adequately capture the characteristics of the input image and yet be robust to noise. One approach for estimating such an order is by its reconstruction error. This requires the comparison of the original input image to its reconstructed version from a set of Zernike moments at a specified Zernike polynomial order. The lower the reconstruction error, the better the order captures image features. The mean square reconstruction error (ε) between the original image and its reconstructed versions at increasing orders is used as a comparative measure to determine this difference as shown in Equation 15:

$$\varepsilon = \frac{\sum_{i=1}^{N}\sum_{j=1}^{N}\left(f(x_i, y_j) - \hat{f}(x_i, y_j)\right)^2}{\sum_{i=1}^{N}\sum_{j=1}^{N}(f(x_i, y_j))^2} \qquad (15)$$

where N is the number of pixels in the x and y directions.

As such, the difference between an image and its reconstructed version from a set of Zernike moments at a defined order can be used as a measure of the validity of the order as representative of the features of the original image. To determine the appropriate order, the contribution of each respective order moments to the reconstruction process is measured by the difference in its reconstruction error from the next order (n) and this difference C(n) is computed as shown in Equation 16:

$$C(n)=\varepsilon_{n-1}-\varepsilon_n \qquad (16)$$

The cumulative sum of these differences for an increasing order can be used to estimate the orders that fully capture the image features. Examples of this process based on cumulative sum plots are shown in FIG. 6 for two reference images and a score image obtained according to disclosed processes.

Figure 6:
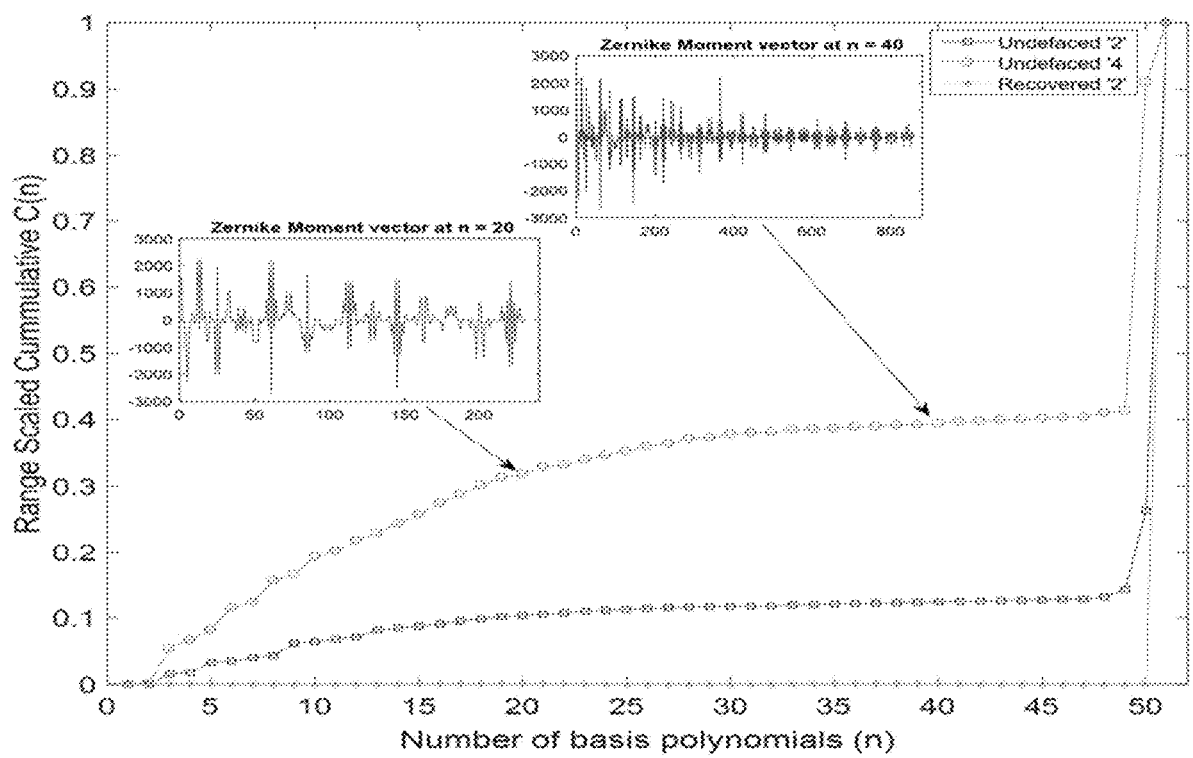
FIG. 6 graphically compares the cumulative mean square error difference for an increasing order of Zernike polynomials of a recovered number image with that for two reference number images.

FIG. 6 shows the image representation ability of Zernike basis polynomials from 1 through 50 determined by the cumulative sum. The cumulative sum increases steadily, for instance to about 10, until all major features have been captured and then it slowly increases indicating little change in the mean square errors for consecutive orders and subtle features are now being included. Ultimately, there is a sudden increase at higher orders indicating all image features have been captured and higher order polynomials are adding non-feature related elements and distorting the reconstructed image. From the plot, this increase occurs at order 51 and thus, it can be deduced that beyond order 50, the reconstructed image is distorted and the Zernike moment vectors will contain non-feature related elements that may impair the classification.

The insets in FIG. 6 show the plots for the Zernike moment vectors at basis polynomial orders of 20 and 40 respectively for a reference library number. Vectors such as these from each image can be used in recreating the image and subsequently the mean square errors.

As indicated in FIG. 3 and FIG. 4, upon feature extraction from the score images, the features can be compared to features similarly obtained from a library of reference marks. For instance, a library of unaltered digit images can be processed in the same fashion as the samples to be identified, and the features extracted from the reference marks of the library can then be compared to the features extracted from the score images of the sample to determine the best match based on similarity measures.

The number and type of images included in a reference data library can vary depending upon the specific application of the identification process. For instance, in those embodiments in which the marks to be identified are known to include only numbers, the reference library can include all numbers 0 through 9, optionally with each number presented in multiple different fonts as may be expected to be used in marking a serial number. By way of example, a reference library can be developed by converting MS Word™ number characters into digital images of numbers for 10 different fonts, providing a reference library that includes 10 sets of data with a total of 100 different entries. Optionally, a reference data library can include both numbers and letters in one or multiple fonts, with particular entries of interest depending upon the identification application. Other shapes including grammatical markings and marks of interest (e.g., trademarks) can be included, as desired.

As indicated in FIG. 4, in order to obtain a useful comparison, feature extraction processes carried out on the score images of the examined sample can likewise be carried out on the reference characters of interest. For instance, Zernike moment vectors can be determined for each library image for comparison to score image Zernike moment vectors. Several comparisons can be made, for example one for each Zernike polynomial order from 15 through 50 in steps of 5 for 8 sets of Zernike moment vector comparisons. Upon comparison of the features of the sample with those of the library contents, the smaller the resulting output from a similarity comparison, the closer the corresponding compared objects are within the characteristics captured by the similarity measure used.

Identifying defaced marks contained in score images using the feature vectors obtained from pseudo Zernike moments or some other feature extraction approach can be done using similarity measures. Similarity measures are computational methods of quantifying the similarity between objects with the smaller the value, the more similar the objects. Any of multiple different similarity measures can be employed to compare the developed score images (or the extracted features from the score images) to images/features contained in a reference library to provide a holistic and unbiased comparison. In general, at least 3 similarity measures can be used, for instance from about 5 to about 20 similarity measures. In addition, the preferred similarity measures for use can vary depending upon the specific characteristics of the marks to be identified. For example, Table 1, below, provides 15 different similarity measures as may be utilized and their equations, each designed to define a perfect match between two vectors as zero and increasing in value with a decrease in similarity.

TABLE 1

| Similarity Measure[a] | Equation |
|---|---|
| Correlation Coefficient (2) | $CC = 1 - \frac{S_{ls}}{S_l S_s}$ |
| Euclidean Distance (2) | $ED = \sqrt{(x_l - x_s)(x_l - x_s)^T}$ |
| Angle (2) | $\cos\theta = 1 - \frac{|x_l^T x_s|}{\|x_l\|\|x_s\|}$ |
| Determinant (1) | $Det = \left\| \begin{pmatrix} x_l^T \\ x_s^T \end{pmatrix} (x_l \; x_s) \right\|$ |
| Procrustes Analysis (PA) (4) | $F = \|F_{sl} - F_{ss}\|_F$ |
| Constrained PA (2) | $H = \|H_{sl} - H_{ss}\|_F$ |
| Mahalanobis Distance (2) | $MD = \sqrt{(x_s - x_l)^T C_s^+ (x_s - x_l)}$ |

[a]Values in parenthesis indicate the number of variations.
$x_l$ = feature vector of reference library image
$x_s$ = feature vector of score image
$\|-\|_F$ = Frobenius norm of the matrix These exemplary similarity rules are described further as follows:

Correlation Coefficient:
Pearson Correlation

This is a measure of the linear relationship between two vectors. A perfect value of 1 means that both vectors have a perfect correlation between them and 0 means there is no correlation between them. In keeping with the convention adopted for this study, the correlation coefficient is subtracted from 1 so that a smaller value will indicate a higher correlation between the vectors.

$$CC = 1 - \frac{S_{ls}}{S_l S_s} = 1 - \frac{\sum_{i=1}^n (x_{si} - \bar{x}_s)(x_{li} - \bar{x}_l)}{\sqrt{\sum_{i=1}^n (x_{si} - \bar{x}_s)^2} \sqrt{\sum_{i=1}^n (x_{li} - \bar{x}_l)^2}} \quad (17)$$

Spearman Correlation Coefficient

For the Spearman correlation, the values within each vector are first ranked before the correlation is calculated as above.

Euclidean Distance:
Vector to Vector Euclidean Distance

The Euclidean distance is a measure of the distance in space between two vectors. This is determined as the square root of the square of the difference between corresponding points in both vectors being compared. The smaller the value of the resulting merit, the higher the degree of similarity between them.

$$ED = \sqrt{(x_l - x_s)(x_l - x_s)^T} \quad (18)$$

Vector Outer Product Euclidean Distance

This is similar to Euclidean distance except the outer vector products are used for the comparison ($X_l = x_l x_l^T$ and $X_s = x_s x_s^T$). The outer products are unfolded to form a vector and Equation 18 is used.

Angle Between Vectors:

This similarity measure is determined as the cosine of the angle between two vectors for a shape comparison. The value is subtracted from 1 for a smaller value indicating a higher degree of similarity between vectors.

$$\cos\theta = 1 - \frac{|x_l^T x_s|}{\|x_l\|\|x_s\|} \quad (19)$$

Square of the Angle:

This measure involves taking the square of the value for the angle between the vectors and then subtracting from 1 for a smaller value for a higher degree of similarity.

Determinant:

This similarity measure is a measure of the space size formed by two vectors and calculated by Equation 20. The smaller the resulting value, the smaller space and hence, the more similar the vectors.

$$Det = \left\| \begin{pmatrix} x_l^T \\ x_s^T \end{pmatrix} (x_l \; x_s) \right\| = (\|x_l\|\|x_s\|\sin\theta)^2 \quad (20)$$

Unconstrained Procrustes Analysis:

This measure is a transformation process that as used herein, determines how much transformation is required to make the matrix formed by one outer vector product similar to another outer vector product. Transformation occurs in the form of rotation, dilation, and translation of each vector to make them match. A Frobenius norm (F) of the matrix difference between the transformation matrices for the two vectors is used as a final measure of the similarity between them. This value represents the matrix from the difference between the transformation matrices as a scalar with a smaller value indicating a higher degree of similarity.

$$X_l = X_s F_{sl} \quad (21)$$

$$F_{sl} = X_s^+ X_l$$

$$X_s^+ = \frac{X_s}{\|X_s\|^4}$$

$$F_{ss} = X_s^+ X_s$$

$$F = \|F_{sl} - F_{ss}\|_F$$

where,
F=a transformation matrix necessary to make $x_s$ most similar to $x_l$ $\|F_{sl}-F_{ss}\|_F$=the Frobenius norm for the matrix difference between the two transformation matrices $F_{sl}$ and $F_{ss}$ calculated as the square root of the sum of squares of each value in the difference matrix Four similarity merits can be obtained using Procrustes analysis in one embodiment. Two by using the mean centered outer products of each of the vectors ($X_l$ and $X_s$) being compared to define the transformation matrix and another two by not mean centering the outer product matrices before determining the transformation matrices. With mean centering, translation correction is included and without mean centering, only rotation and dilation are evaluated.

Constrained Procrustes Analysis

This transformation measure defines individually the degrees of dilation and rotation required after translation to make the two vectors similar. As with unconstrained Procrustes analysis, the Frobenius norm is used to determine a final scalar similarity merit, a smaller value indicating a higher degree of similarity.

$$X_{sl}=X_s^T X_l=U_{sl}\Sigma_{sl}V_{sl}^T$$

$$H_{sl}=u_{sl}V_{sl}^T$$

$$X_{ss}=X_s^T X_s=U_{ss}\Sigma_{ss}V_{ss}^T$$

$$H_{ss}=u_{ss}v_{ss}^T$$

$$H=\|H_{sl}-H_{ss}\|_F \quad (22)$$

where,
 U=eigenvectors of matrix $XX^T$
 u=first eigenvector in U
 Σ=diagonal matrix of singular values
 V=loading matrix=eigenvectors of matrix $X^T X$
 v=first eigenvector in V Two possible sets of similarity merits are obtained, with one set involving mean centered outer product arrays (translation is included) and the other set without mean centering (only rotation and dilation).

Mahalanobis Distance:

This is a distance measure that determines the distance of a vector from a space formed by an array of vectors. To use this measure as a distance measure between two vectors, the pseudoinverse of the outer product of one of the vectors is taken as the usual covariance matrix used in the Mahalanobis distance estimation. A smaller merit value in this measure indicates a smaller distance in space, and hence a higher degree of similarity between the vectors.

$$MD=\sqrt{(x_s-x_l)^T X_s^+(x_s-x_l)} \quad (23)$$

Another similarity merit can be obtained using the Mahalanobis distance measure defined in Equation 23 by exchanging the outer vector product matrix $X_s$ for $X_l$.

With multiple score images being compared using several sets of extracted feature vectors across multiple reference images using multiple similarity measures each, there is a need to determine a consensus across the large number of resulting similarity values obtained. By way of example, in an embodiment including 15 score images being compared with 8 sets of Zernike moment vectors across 10 reference number sets using 15 similarity measures each, there is a need to determine a consensus across the resulting 18000 (15×8 x 10×15) similarity values obtained. To achieve consensus, a high level data fusion approach can be applied. Multiple fusion rules can also be used where each rule is applied to extract a consensus value from all similarity values relative to each number identification possibility. As such, it can be beneficial to combine the individual similarity values in a way that establishes an objective consensus to the comparison results.

In one embodiment, this consensus can be achieved by exploiting high level data fusion to combine the similarity values for each possible mark identity into a single output. As is known in the art, data fusion is a technique used in combining individual sources of information into a single informative output with improved reliability and less ambiguity. Exemplary data fusion rules can include, without limitation, sum, geometric mean, harmonic mean, median, L2 norm, L1 norm, truncated geometric mean, and truncated harmonic mean.

The equations below show these exemplary fusion rules as may be utilized to combine the similarity values (e.g., n=18000) into a single defining value. In these equations $S_i$ denotes each similarity value for the ith measurement where i varies relative to the particular Zernike moment vector score image and library font.

$$\text{Sum} = \sum_{i=1}^{n} S_i \quad (24)$$

$$\text{Median} = med\{S_1 \ldots S_n\} \quad (25)$$

$$L\text{-2 norm} = \sqrt{\sum_{i=1}^{n} S_i^2} \quad (26)$$

$$L\text{-1 norm} = \sum_{i=1}^{n} |S_i| \quad (27)$$

$$\text{Geometric mean} = \sqrt[n]{S_1 * S_2 * \ldots * S_n} \quad (28)$$

$$\text{Harmonic mean} = \left(\frac{1}{n}\sum_{i=1}^{n} S_i^{-1}\right)^{-1} \quad (29)$$

The $S_i$ values are either raw values (normalized) or rank values. Using raw and rank values makes for 12 fusion rules. Two additional rules can be used only on the raw normalized values. These are:
1. Truncated geometric mean rule: The truncated geometric mean utilizes a defined percentage of the lowest values to determine the geometric mean instead of using all values. The lowest 75% of values are used in this study.
2. Truncated harmonic mean rule: This rule is similar to the truncated geometric mean except it utilizes the harmonic mean of the truncated values.

TABLE 2

| Rule | Normalized raw values notation | Rank values notation |
| --- | --- | --- |
| Sum | S | SR |
| Median | M | MR |
| L-2 norm | L2 | L2R |
| L-1 norm | L1 | L1R |
| Geometric mean | GM | GMR |
| Truncated Geometric mean | TrGM | — |
| Harmonic mean | HM | HMR |
| Truncated Harmonic mean | TrHM | — |

Briefly, all similarity values for a given defaced mark can be assembled into a matrix in which the columns correspond to the mark identification targets, e.g., 0 through 9. Each row can be normalized to unit length to remove magnitude variations between the values from respective similarity measures. Each fusion rule can then be applied to the columns of this matrix as well as to the matrix after transformation in order to rank values. In some embodiments, one or all of the data fusion rules can be applied twice, once to raw values and again to rank values.

The defaced mark can then be identified as identical to the reference mark that is most consistently ranked lowest across the fusion rules according to a majority vote, e.g., eight of fourteen rules and/or according to a sum rule, in which case a sum across the ranked fusion rules is lowest or according to any other ranking measure or combination thereof. To improve confidence in the identification, multiple rankings can be utilized, e.g., both the majority vote and sum rule can be in unison on identifying a number in an identification exhibiting high confidence (approaching 100% conclusiveness).

The present disclosure may be better understood with reference to the Examples set forth below.

Example 1

Figure 7:
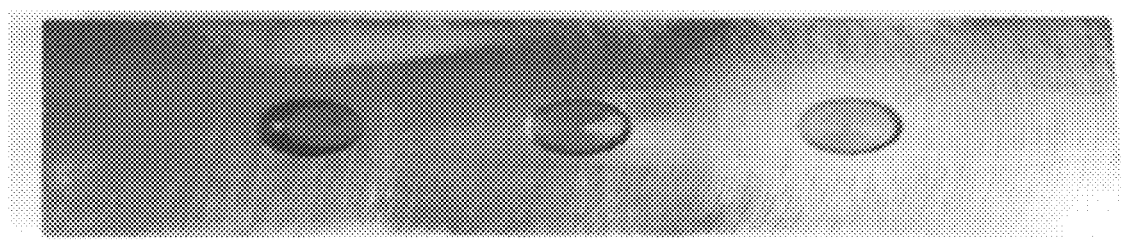
FIG. 7 illustrates holes drilled to different depths in a steel plate utilized in an example described herein.

Three holes of 6 mm diameter were drilled into a stainless steel plate to depths of 5.3 mm, 4 mm, and 1.8 mm, respectively. This was done to simulate subsurface defects. A lock-in thermography process was then employed in an attempt to identify the holes from the opposite side of the plate. FIG. 7 illustrates the holes drilled into the plate.

Figure 8:
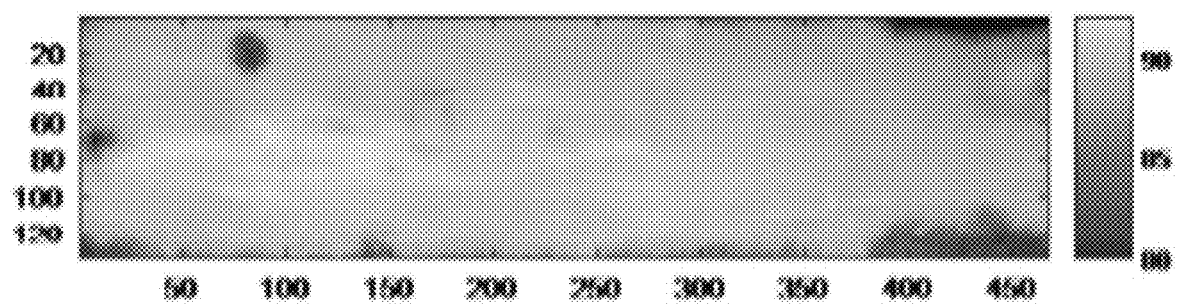
FIG. 8 presents a thermal image of the opposite side of the plate of FIG. 7.

FIG. 8 shows the IR thermal image of the opposite side of the stainless steel plate (i.e., the side opposite that into which the holes were drilled). From this image, it is impossible to identify the thermal gradient differences that are characteristic of the areas at the bottom of the subsurface holes, highlighting the limitations of thermal imaging used with no further data processing.

Figure 9:
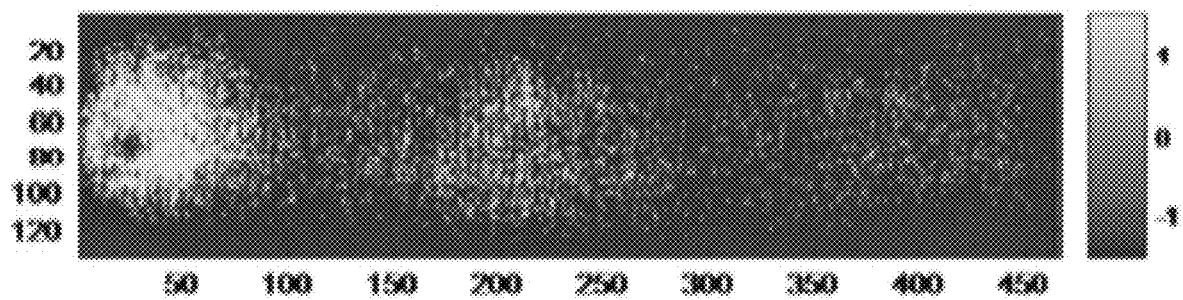
FIG. 9 presents a phase image of the opposite side of the plate of FIG. 7 obtained via lock-in thermal imaging.

FIG. 9 presents a phase image developed from a plurality of the IR thermal images of the plate. As can be seen, this phase image can somewhat identify the underlying defects lying beneath the surface, with the defect surface of the deepest hole, i.e., the defect that is closest to the imaged surface (left), showing clearly and reduction in clarity with the increasing distance from the imaged surface to the defect.

Figure 10:
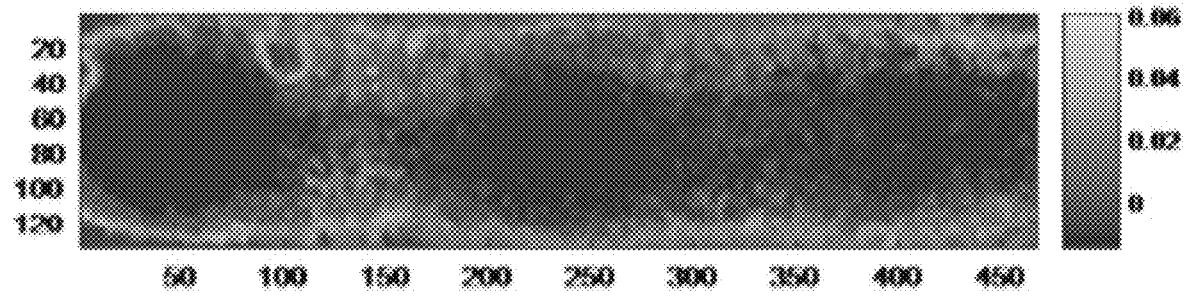
FIG. 10 presents a principal component (PC) score image developed from multiple phase images of the opposite side of the plate of FIG. 7.

FIG. 10 presents the PC score image developed from a plurality of phase images of the area of the stainless steel plate. As can be seen, the PCA analysis can help to identify the local characteristics within the defect areas and improve delineation from the background. However, using only PCA analysis, identification of a more complicated shape would prove difficult if not impossible.

Example 2

A stainless steel plate (72 mm×25 mm) stamped with several numbers to depths of approximately 0.2 mm was used to simulate mechanically stamped serial numbers (FIG. 11). A clean stainless steel surface with no numbers stamped into it served as a control. The test piece was originally 6.35 mm thick. A uniform thickness of 0.18 mm was mechanically shaved off the top surface, leaving the numbers barely visible. Each number except the first was progressively shaved off roughly such that the machining depth progressively increased by 0.02 inch or 0.5 mm in going from one number to the next such that the metal below the number 0 was machined to a depth of 0.08" or 2 mm more than for the number 2. The machined depth was increased to 0.04" for the 1 and the 3. The first number on the plate, the number 2 is the first number and the metal around that number was machined to a depth of 0.18" below the top metal surface to a point where it is just still visible to serve as a control.

After the defacing (FIG. 12), it was impossible to visually identify the numbers present before the material was removed. The sample was then sanded using a 600-grit sand paper to polish off the surface and thoroughly cleaned with ethanol to remove any residue from the sanding process, ensuring a smooth surface as shown in FIG. 12. Thermal images were initially collected by an infrared camera to cover areas including two numbers. The thermal image datasets were then split to contain the boxed areas as indicated in FIG. 12, each of which includes a single number. Each boxed area was analyzed separately. The surface area around each of the defaced numbers was covered with a light coat of India ink (~30 picometers) to reduce the possible adverse effects from surface emissivity on the quality of the captured images.

The experimentation system included an infrared camera, a function generator and thermal energy source similar to that illustrated in FIG. 2. The primary thermal energy source, a 5 W Ar-ion cw laser, operating in all-lines mode, was chopped with a Uniblitz mechanical shutter to apply pulsed energy to the sample. The laser was setup to put out 3 W of thermal energy. Losses through a top-hat filter which transformed the Gaussian shape of the beam into a uniform intensity beam as well as the prisms accounted for about half of the power allowing approximately 1.5 W to reach the sample. This power level gave a good tradeoff between inducing a temperature swing in the sample over the pulsing cycle while avoiding overheating the sample and thus losing the ability to capture the small thermal gradients characteristic of the zone of plastic strain.

A FLIR SC6700 infrared camera was used to collect thermal images of the sample surface and a Stanford Research Systems model DS340 15 MHz function generator synched with the camera was used to control the pulse rate of energy from the laser. A synchronizing circuit was used to synchronize the laser pulses with the camera's imaging apparatus ensuring a consistent rate of capturing images over an entire pulse irrespective of the cycle time used. A digital hot plate was used to heat up the sample to an initial temperature of approximately 73° C. as measured by a digital thermometer. This was done to ensure that the sample was at an even initial temperature and to enhance the contrast of the thermal gradient across the surface to improve contrast. During the experiments, the sample on the hot plate was placed in the focus range of the camera and thermal energy was pulsed into the surface of the sample under observation using the laser at a defined modulated (lock-in) frequency of 0.05 Hz. As discussed previously, the lock-in frequency could be changed to accommodate a variety of frequencies. The temperature distribution on the heated surface was monitored using the infrared camera with images over the pulsing cycle. Images were simultaneously collected at a frame rate of 32 frames per pulse cycle, which can also be adjustable. This process was carried out for several cycles.

Principal component analysis was carried out on the multiple images. 15 pulse cycles were used for these studies though, as discussed previously, the number of pulse cycles can be varied. FIG. 13 presents a mean temperature-time plot across all pixels of a defaced area showing the pulsing of thermal energy through the sample over time. The values over each peak show the maximum temperature value in that cycle. Control of the heating was difficult and slight variations in the maximum temperature over the course of the 15 cycles was a typical occurrence.

Each pulse cycle was used to develop one amplitude and one phase image in which the contrast change across the surface due to the thermal gradient change from the defects was improved. Fifteen of these images were developed, each at an increasing temperature from the input energy pulse. PCA was carried out independently on the matrix of the phase images and on the matrix of the amplitude images. Respective score images thus obtained were visually inspected to determine if phase or amplitude score images best reproduced the defaced number. This proved to be the amplitude images for the defaced 6, 2 and 0 and the phase images for the defaced 5.

Figure 14:
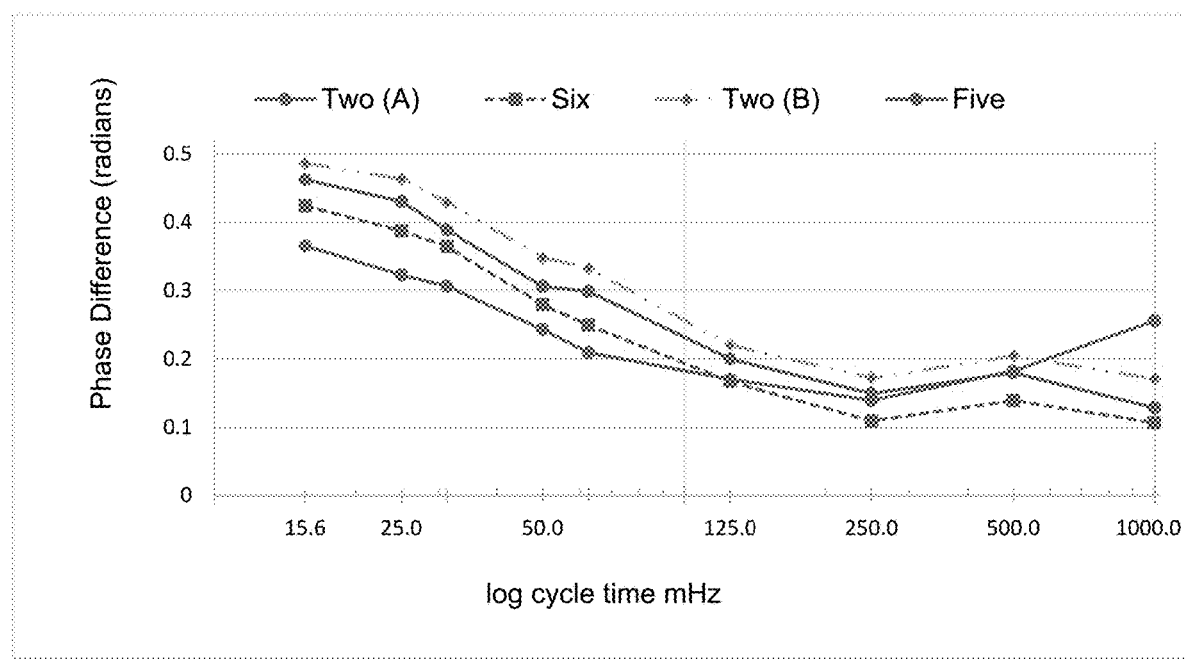
FIG. 14 presents phase difference plots for each defaced number on stainless steel sample.

FIG. 14 shows the phase difference plots for the measured defaced areas. The phase differences were calculated as the difference between the phase values within the defaced region where the number previously existed and average phase values of a clean non-stamped area for various lock-in frequencies. From this figure, it can be observed that while there is no blind frequency for the numbers, suboptimal frequencies exist that give the least contrast range from 250 mHz to 1000 mHz where the phase differences oscillate in a range of less than 0.2 rad. Phase differences increase afterwards allowing for the selection of optimal frequencies for all the defaced numbers observed to range from 50 mHz to 15.6 mHz for this sample.

Figure 15:
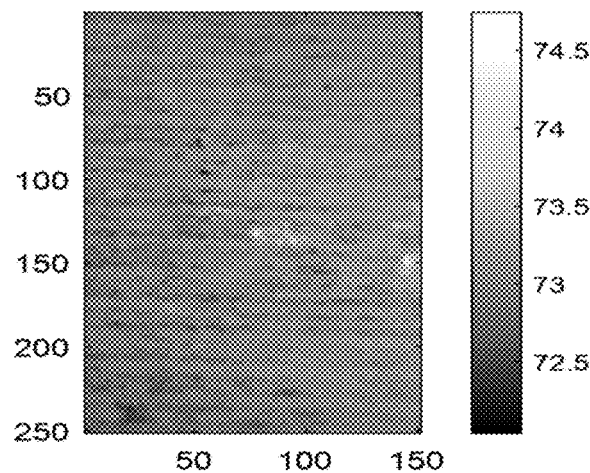
FIG. 15 provides a raw thermal image of a clean surface (axes represent the pixel coordinates and the side bar shows the temperature range (° C.) of the sample).
Figure 16:
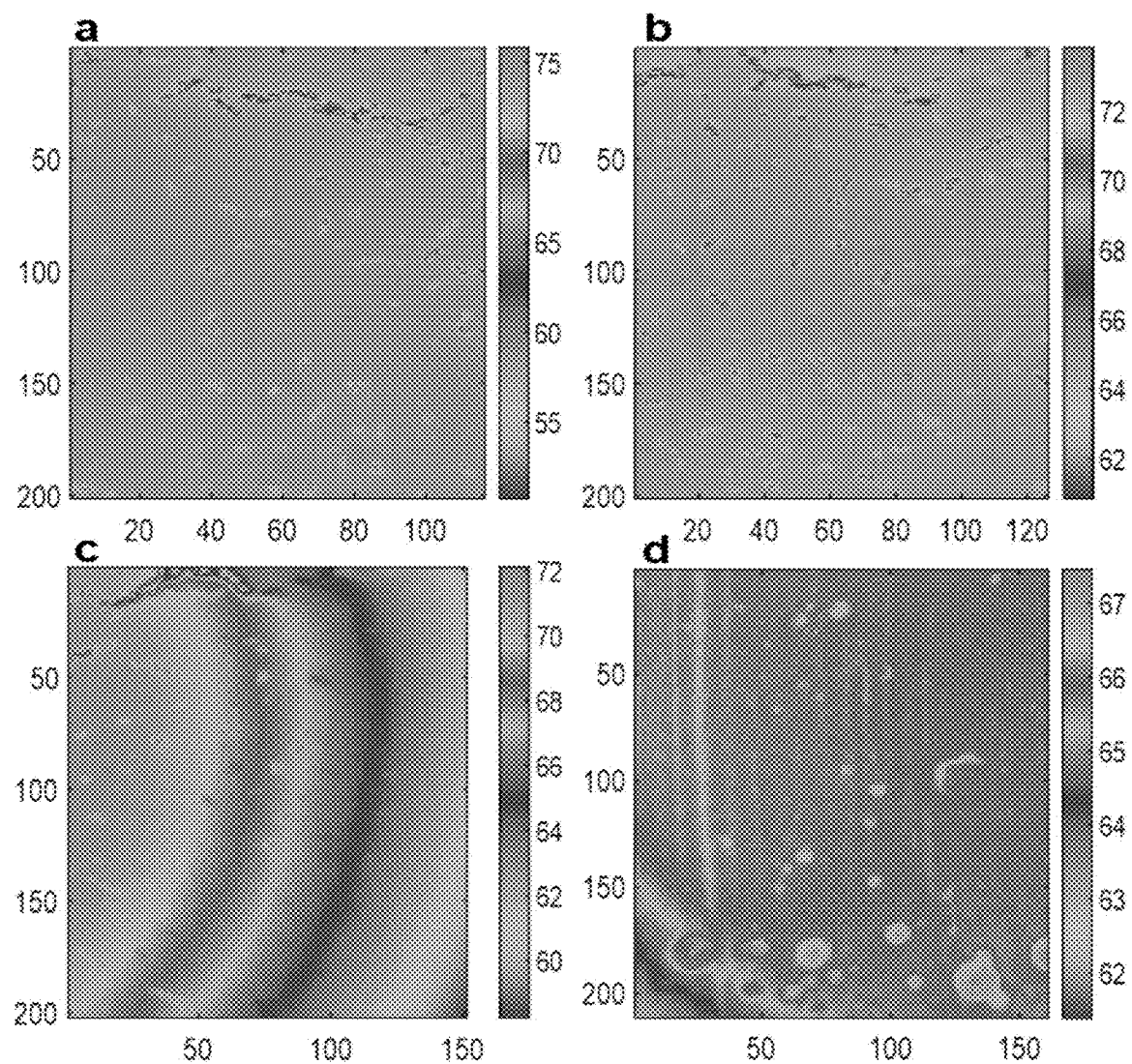
FIG. 16 presents raw thermal images of areas around defaced numbers a) six b) two c) five d) zero (axes represent the pixel coordinates and side bars show the temperature range (° C.) of the sample).

FIG. 15 shows the mean infrared thermal image for one pulse cycle of a clean stainless steel surface left intact with no number stamped into it. The image is comparable to those shown in FIG. 16 for the areas around the defaced numbers (the boxed in areas in FIG. 12). As with the sample at room temperature, the numbers removed could not be uniquely distinguished from a clean surface in the infrared thermal images.

Figure 17:
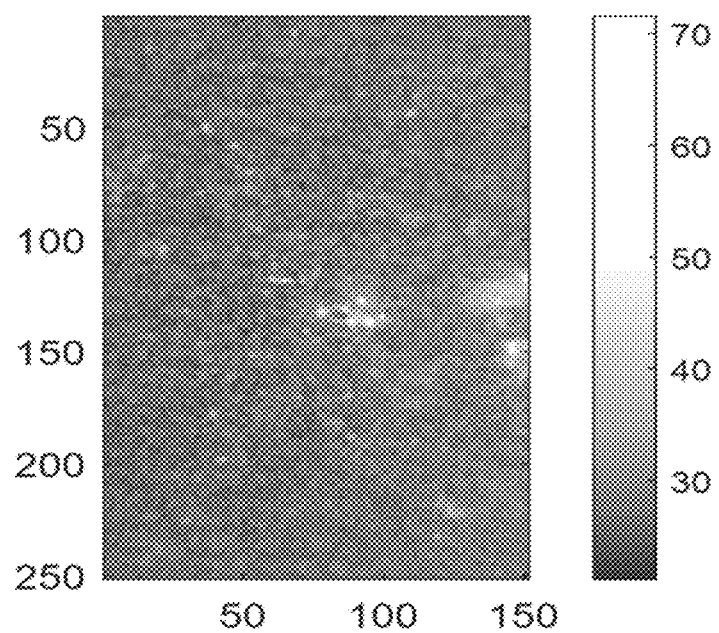
FIG. 17 presents a phase image of a clean surface (axes represent the pixel coordinates and the side bar shows the degree of phase shift).
Figure 18:
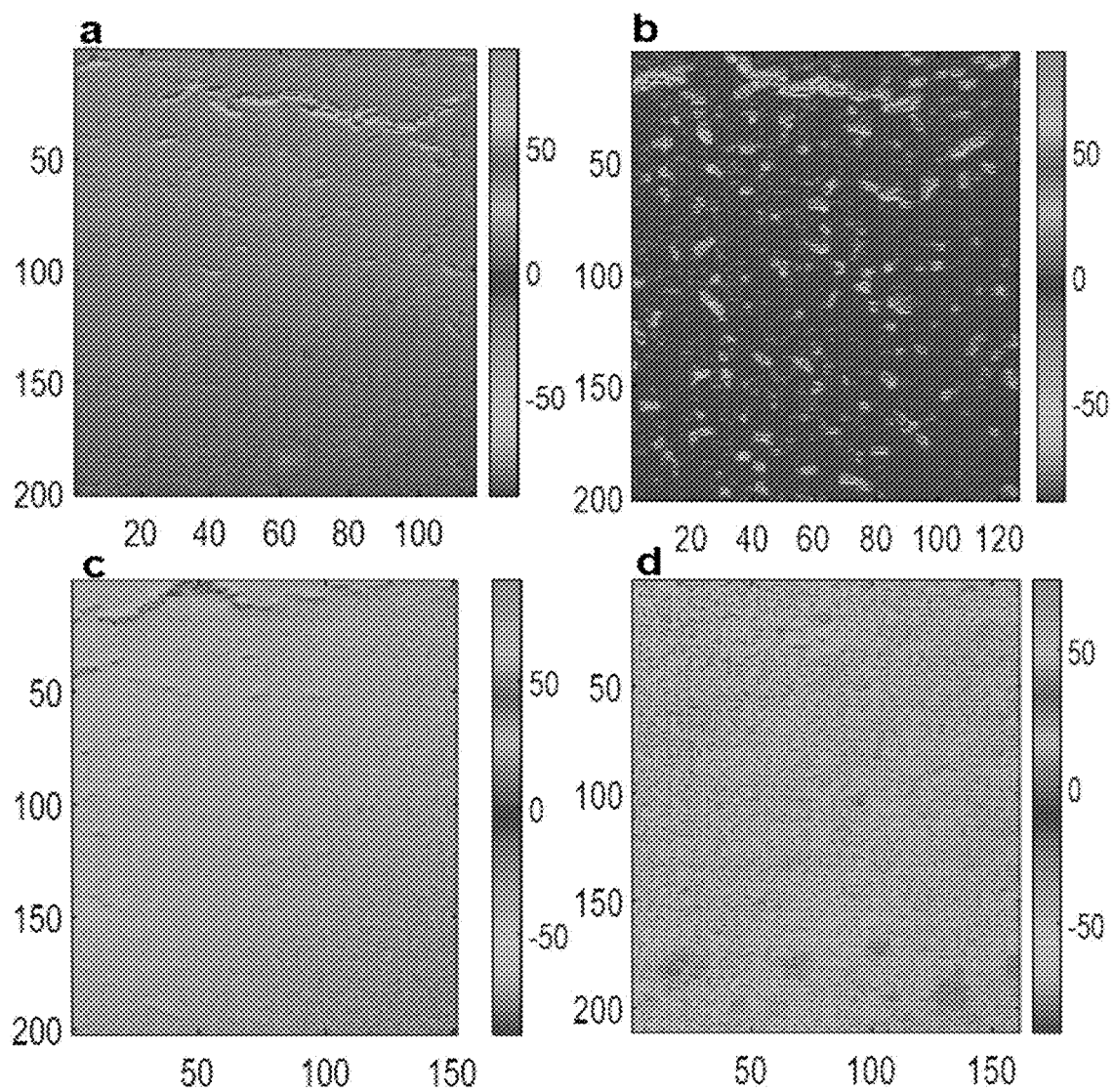
FIG. 18 presents phase images of areas around defaced numbers a) six b) two c) five d) zero (axes represent the pixel coordinates and the side bar shows the degree of phase shift).

FIG. 17 and FIG. 18 show phase images over a single pulse cycle for the clean region and defaced numbers respectively. Although the phase images have effectively removed such unwanted features such as inhomogeneous illumination as well as surface radiation and local emissivity variations from the images, it is still impossible to identify the numbers.

Table 3, below, shows the percent variance of information explained in each PC. As by convention, PC1 explains the most amount of variance and the other PC's explain some of the remaining variance present in decreasing order. The underlined and bolded cells indicate the PC where the defaced number was best reproduced for each dataset.

TABLE 3

| | Percent Variance (%) | | | | |
|---|---|---|---|---|---|
| PC | Clean area | Six | Two | Five | Zero |
| 1 | 99.0328 | 98.5497 | 82.2910 | 99.8550 | 48.6725 |
| 2 | 0.5639 | 1.0724 | 16.8583 | 0.0820 | 8.9673 |
| 3 | 0.2580 | 0.2219 | 0.7022 | 0.0375 | 5.5631 |
| 4 | 0.1152 | 0.0993 | 0.0624 | 0.0125 | 5.4441 |
| 5 | 0.0108 | 0.0312 | 0.0283 | 0.0060 | 4.7530 |
| 6 | 0.0064 | 0.0142 | 0.0162 | 0.0017 | 4.4526 |
| 7 | 0.0027 | 0.0052 | 0.0127 | 0.0013 | 3.7963 |
| 8 | 0.0023 | 0.0027 | 0.0074 | 0.0010 | 3.6741 |
| 9 | 0.0019 | 0.0010 | 0.0055 | 0.0008 | 3.2420 |
| 10 | 0.0014 | 0.0009 | 0.0046 | 0.0006 | 2.8108 |
| 11 | 0.0012 | 0.0006 | 0.0034 | 0.0004 | 2.5601 |
| 12 | 0.0009 | 0.0004 | 0.0029 | 0.0004 | 2.2362 |
| 13 | 0.0008 | 0.0003 | 0.0021 | 0.0003 | 1.9693 |
| 14 | 0.0007 | 0.0002 | 0.0016 | 0.0002 | 1.1534 |
| 15 | 0.0006 | 0.0002 | 0.0016 | 0.0002 | 0.7053 |

Figure 19:
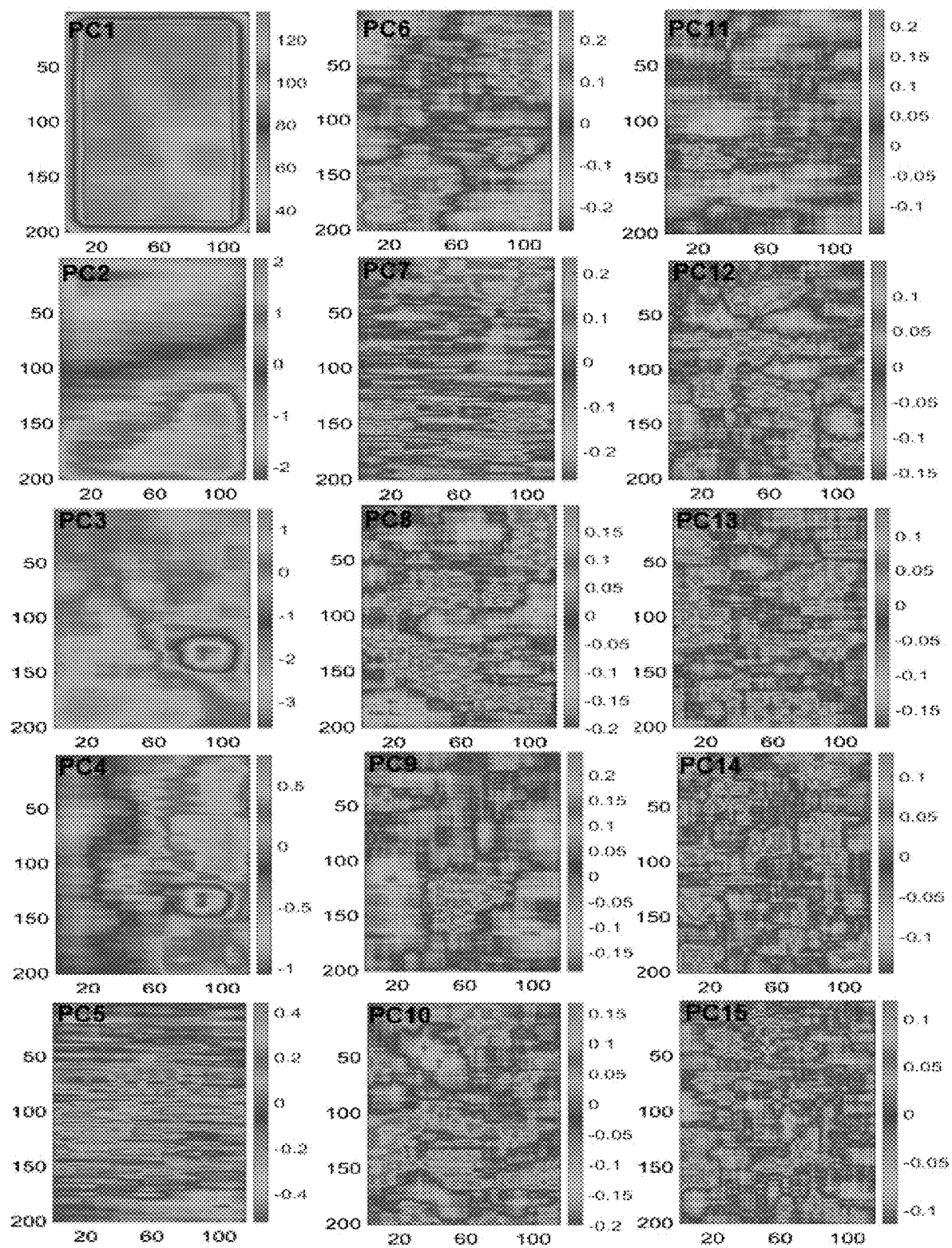
FIG. 19 presents score images for clean surface (axes represent the pixel coordinates and the side bar shows the range of score values).

FIG. 19 presents the score images from the clean undefaced region. PC1 is responsible for 99% of the variance within the images. PC 2 through PC 15 is responsible for the remaining 1% of the variance. The score images show no identifiable structure although with some random high intensity areas due to surface roughness of the sample. This is expected, as no crystalline deformation exists within the sample in this region.

Figure 20:
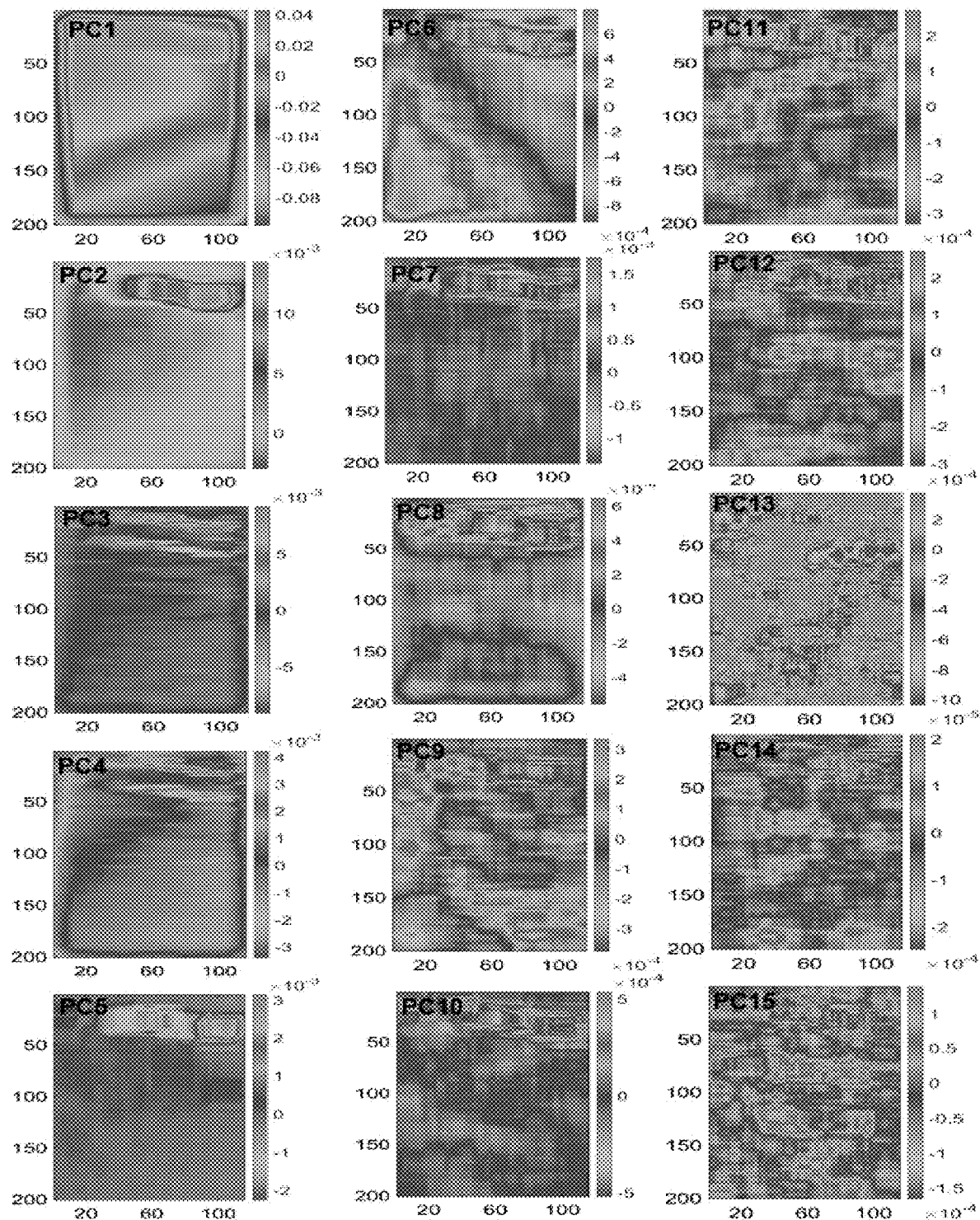
FIG. 20 presents score images for area around defaced number six (axes represent the pixel coordinates and the side bar shows the range of score values).

FIG. 20 shows the score images from the amplitude images of the area around the number "6". The first principal component PC1 is responsible for 98% of the variance and PC 2 through PC 15 for the remaining 2%. However, unlike for the clean area, one of the score images (PC13) shows defined intensity contrast localized around the section where the number previously existed. This PC accounts for only 0.0003% of the variance across the phase images. This can be attributed to how relatively small the phase shift due to thermal gradient differences in the zone of plastic strain is compared to other sample features within the thermal depth range, highlighting, the robustness of PCA in recognizing and characterizing such small variances across the pixels.

Figure 21:
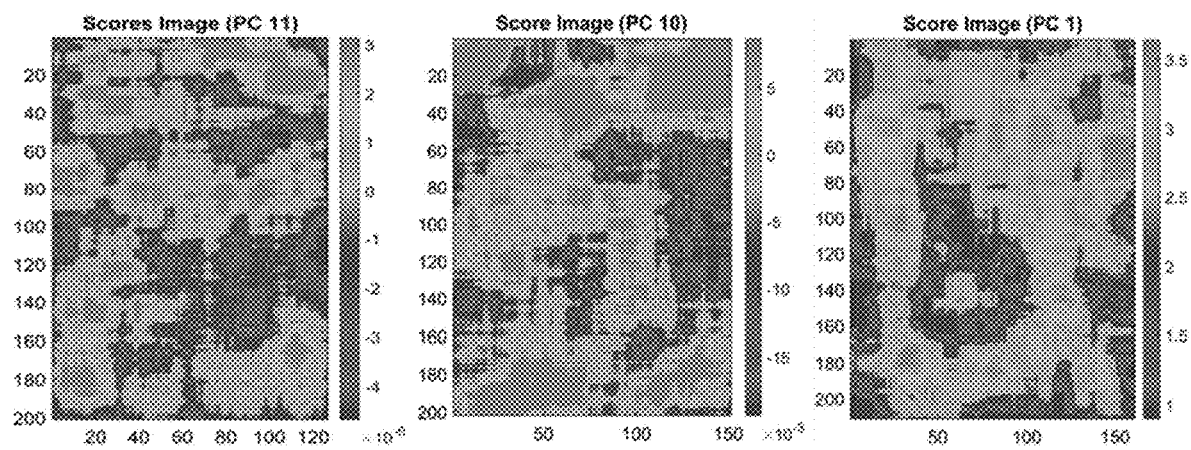
FIG. 21 presents score images showing recovered numbers a) two b) five c) zero (axes represent the pixel coordinates and the side bar shows the range of score values).

FIG. 21 similarly shows the refolded score images (contrast adjusted) from PCA of the regions around the numbers "2" (left), "5" (center) and "0" (right). PC 11 presented in FIG. 21 (left) shows some contrast in the region where the number existed. This PC accounts for only 0.003% of the variance. Likewise, for the defaced 5, PC 10 shown in FIG. 21 (center) shows some contrast in intensity allowing for possible identification of the number that was defaced. PC 1 (FIG. 21 (right) accounting for 49% of the variance shows intensity contrast to possibly identify the number 0 that was defaced. The relatively larger value in the variance accounted for in the PC that reproduced this number was due to the fact that the number was initially stamped deeper than the others and so had a more extensive zone of plastic strain. This allowed for the thermal gradient difference in this region to account for a larger percentage of the variance in the thermal depth range.

The difference in the PC best identifying the thermal gradient variation and reproducing the defaced number could be attributed to discrepancies in the surface conditions around each number from the machining process used in removing them as well as some variation in the depth of stamped marks and consequently the depth of the zone of plastic strain. Although hard to visually observe, PCA in projecting the phase images into different orthogonal directions reproduced the variation in degree of phase shift between the phase images independent of other linear variations in a single score.

Figure 22:
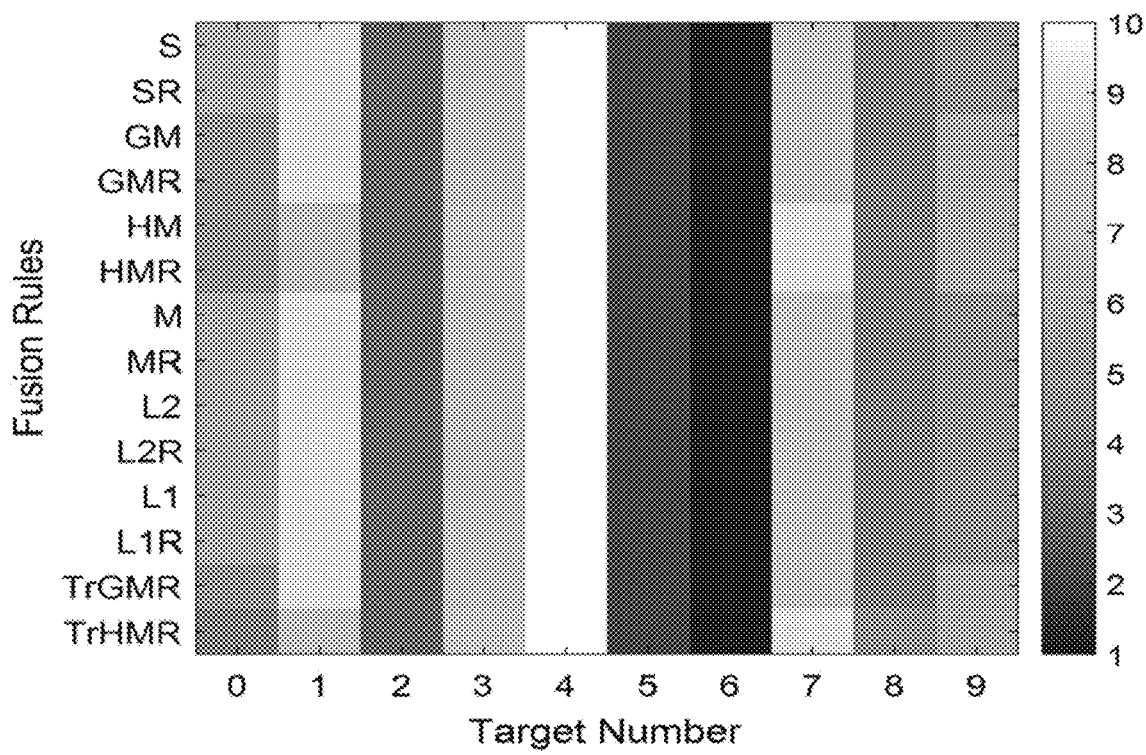
FIG. 22 presents an image of fused measures from all fusion rules for the recovered number 6 (side bar shows rank from 1 to 10).

The similarity measures, obtained by comparing the Zernike (or pseudo-Zernike) moments of the score images to those of the number library, and fusion rules described above were utilized to further examine the score images. FIG. 22 images the results of each fusion rule applied across the merits from comparing the recovered number "6" to each digit. This image gives a visual representation of the results used to independently verify the recovered numbers. As can be seen from the figure, the process worked efficiently in matching the recovered number to a "6", consistently having the lowest rank across the fusion rules.

Table 4, below, shows the final results with using both majority vote and sum across the fusion rules. This table reiterates the information in FIG. 22 In showing that there is an overall consensus across all the fusion rules matching the recovered number to a 6. Again, in order to correctly match a defaced number to a target number, the defaced number must be ranked lowest by a majority vote of the fusion rules and have the lowest sum of the ranked fusion rule values. Otherwise, the defaced number is non-identifiable.

TABLE 4

| | Target Number | | | | | | | | | |
|---|---|---|---|---|---|---|---|---|---|---|
| | 0 | 1 | 2 | 3 | 4 | 5 | 6 | 7 | 8 | 9 |
| Majority Vote | 6 | 9 | 3 | 7 | 10 | 2 | 1 | 8 | 4 | 5 |
| Sum | 77 | 120 | 42 | 101 | 140 | 28 | 14 | 115 | 57 | 76 |

Figure 23:
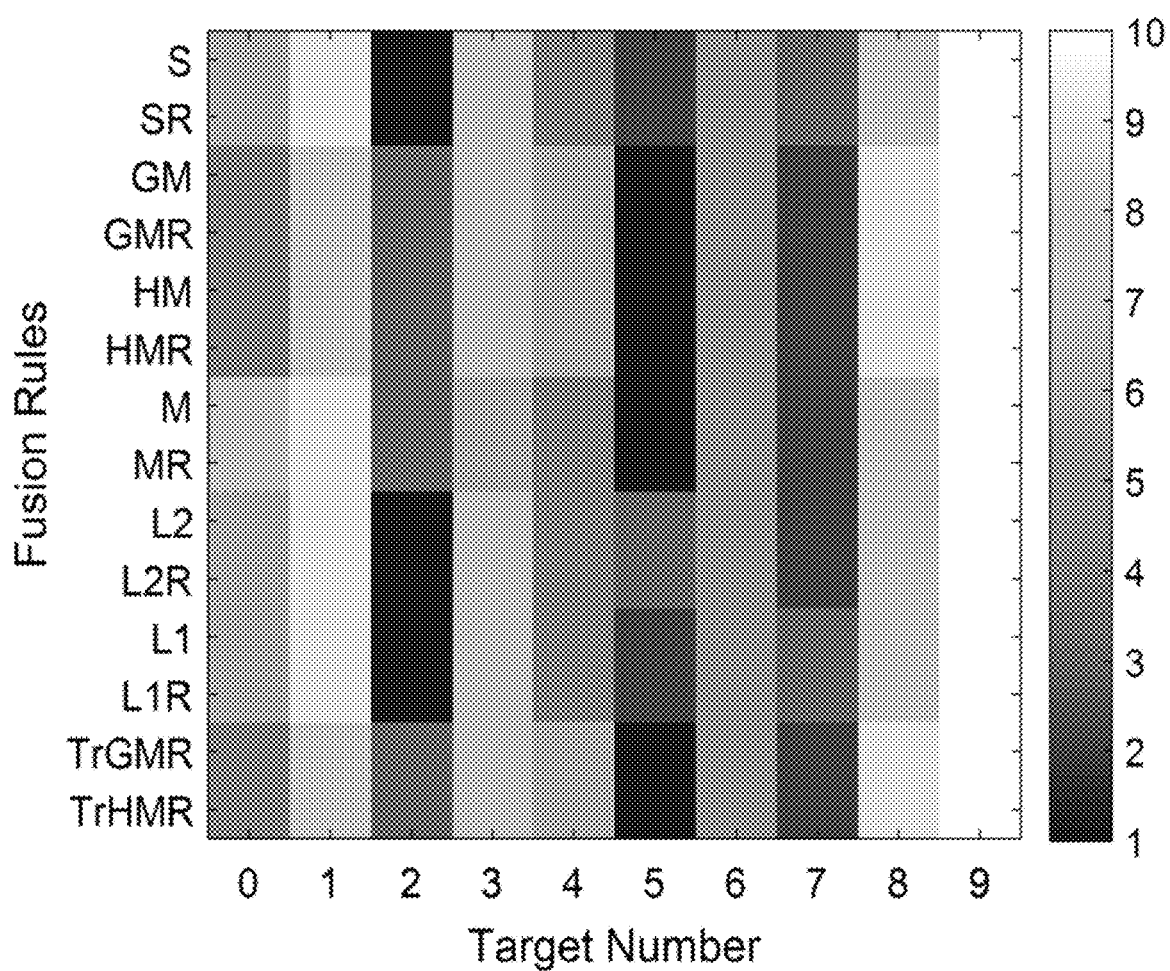
FIG. 23 presents an image of fused measures from all fusion rules for the recovered number 5.

The process is similarly efficient in Tables 5 through 7, below, in matching the recovered numbers to their corresponding digits. However, as seen in Table 6, for the identification of the defaced "5", there is an increase in the sum across the fusion rule ranks. This as can be seen in the visual representation of the fused merits across the fusion rules in FIG. 23, is a result of some of the fusion rules misclassifying the number, possibly due to some score images being misidentified. This highlights a benefit of utilizing a consensus among the fusion rules. Both the consensus methods applied correctly matched the recovered number to the right digit despite the contrasting results from some fusion rules.

TABLE 5

| | Target Number | | | | | | | | | |
|---|---|---|---|---|---|---|---|---|---|---|
| | 0 | 1 | 2 | 3 | 4 | 5 | 6 | 7 | 8 | 9 |
| Majority Vote | 5 | 0 | 1 | 8 | 10 | 2 | 4 | 0 | 0 | 7 |
| Sum | 72 | 115 | 14 | 112 | 138 | 36 | 52 | 87 | 38 | 106 |

TABLE 6

| | Target Number | | | | | | | | | |
|---|---|---|---|---|---|---|---|---|---|---|
| | 0 | 1 | 2 | 3 | 4 | 5 | 6 | 7 | 8 | 9 |
| Majority Vote | 0 | 9 | 3 | 7 | 4 | 1 | 5 | 2 | 8 | 10 |
| Sum | 74 | 120 | 30 | 96 | 68 | 22 | 70 | 32 | 118 | 140 |

TABLE 7

| | Target Number | | | | | | | | | |
|---|---|---|---|---|---|---|---|---|---|---|
| | 0 | 1 | 2 | 3 | 4 | 5 | 6 | 7 | 8 | 9 |
| Majority Vote | 1 | 7 | 2 | 10 | 3 | 5 | 6 | 4 | 9 | 8 |
| Sum | 14 | 104 | 28 | 138 | 48 | 70 | 84 | 50 | 128 | 106 |

Example 3

Figure 24:
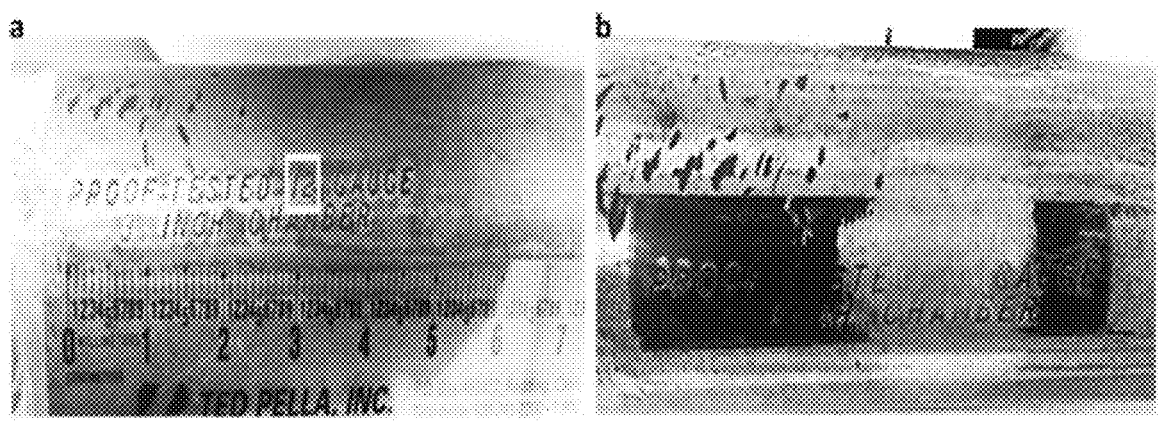
FIG. 24 presents images of a gun barrel with a) identification marks stamped in and b) numbers defaced. (An India ink coating has been partially removed from the areas with the numbers 1 and 2 for ease of viewing.)

The barrel of a Stevens Model 95 12-gauge shotgun was acquired for use as a test piece. The shotgun had no serial number and hence, two numbers were stamped on the barrel and then defaced using a file. FIG. 24 shows images of the barrel before (a) and after (b) defacing.

The surface was prepared and data was collected as described in Example 1, above. For the samples in this study, images are collected over 16 pulse cycles. Testing was extended from the 0.5 Hz of Example 1 to four modulation frequencies. These frequencies were 1 Hz, 0.125 Hz, 0.05 Hz, and 0.03125 Hz corresponding to 1 second, 8 seconds, 20 seconds, and 32 second pulse cycle times respectively.

The camera setup was adjusted with the camera field of view focused to capture areas over two of the removed numbers, so as to enhance the detail captured with more pixels across a single number and to assure an even spread of the pulsed thermal energy from the laser beam to avoid possible lateral thermal gradients. Each dataset of thermal images captured was then digitally split to have datasets that were focused on the areas around each defaced number.

Each pulse cycle was used to develop one amplitude and one phase image which had improved contrast from thermal gradient changes across the surface due to the reduction of emissivity effects.

Figure 25:
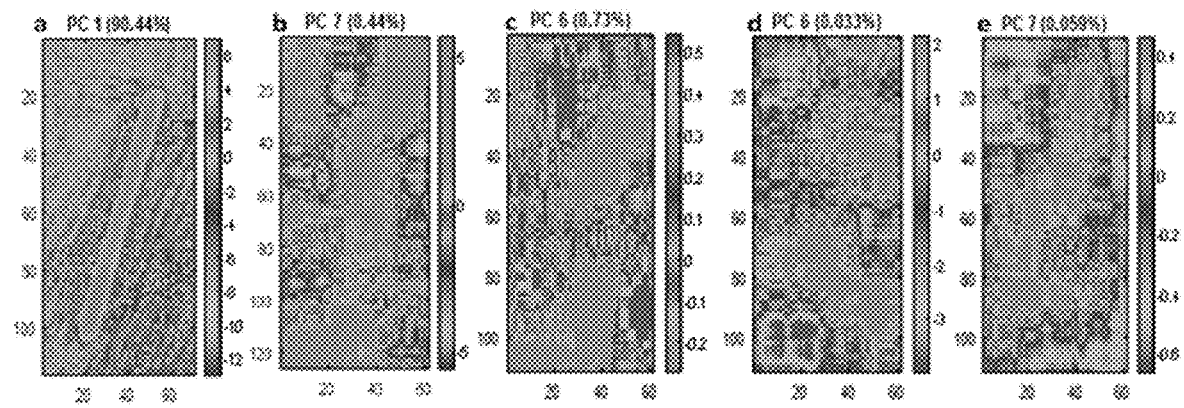
FIG. 25 presents gun barrel score images of a) Clean 1 before defacing, and after defacing at b) 1 Hz, c) 0.125 Hz, d) 0.05 Hz, and e) 0.03125 Hz.

PCA was carried out independently on the matrix of the phase images and that of the amplitude images developed from thermal images collected at each of the modulation frequencies. Respective score images were visually inspected to determine if phase or amplitude score images best reproduces the defaced number at a modulation frequency. For the area around the first defaced number on the gun barrel, a visual examination of the score images indicated that at all four modulation frequencies, the phase images better captured the thermal gradient variations within the zone of plastic strain to characterize the number. FIG. 25 shows the PCA score images for this area both before (a) and after (b-e) defacing. The defaced number is a 1 and shows up in the first PC as expected before defacing. However, after defacing, the score images with the recovered number are at higher PCs for each of the different modulation frequencies tested. This can be attributed to the phase shift due to thermal gradient differences within the defaced region accounting for a very small percentage of the variation compared to other thermal features within the thermal depth range.

From these images, it can be inferred that all four modulation frequencies could induce adequate thermal gradients that would reproduce the number in the zone of plastic strain to varying degrees of clarity.

Figure 26:
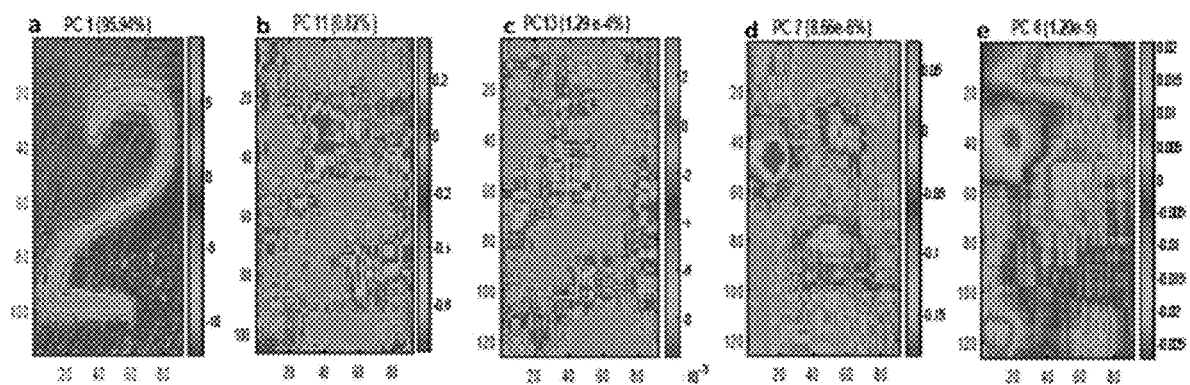
FIG. 26 presents gun barrel score images of a) Clean 2 before defacing, and after defacing at b) 1 Hz, c) 0.125 Hz, d) 0.05 Hz, and e) 0.03125 Hz.

Similarly, for the second defaced number, PCA was carried out independently on the matrices of the phase images and the amplitude images, and their respective score images visually inspected to determine which set best reproduces the defaced number at a modulation frequency. This proved to be the phase images for frequencies 1 Hz, 0.05 Hz, and 0.03125 Hz. and the amplitude images for 0.125 Hz. As shown in FIG. 26, the number 2 showed up in PC 1 for PCA carried out on a thermal image dataset of the number before defacing (a). After defacing (b-e), the zone of plastic strain characterizing the defaced was is again captured in higher PCs for each of the different modulation frequencies used.

It was deduced that the four modulation frequencies used in the experiments were adequate for collecting thermal images to capture the distinctive thermal gradient in the zone of plastic strain. However, there can be some slight differences in the quality of the recovery due to changes in the depth of defacing and also the force used in the stamping.

The number identification protocol used is similar to that described in Example 1, with the addition of the use of pseudo Zernike moments in feature extraction. All score images developed from each of the four modulation frequencies tested were used in the identification process, eliminating any need to preselect a particular frequency to use.

Application of the similarity measures and fusion rules described above were utilized to further examine the extracted features. The identification of the defaced numbers was achieved by using two methods to obtain consensus from the 14 fusion rules. These methods were majority vote and arithmetic sum. The majority vote consensus rule provided the numerical rank proposed by more than half of the fusion rules (8 out of 14 fusion rules) in comparing the score images to the reference library images of a particular number (target number).

The reference library images were created by first typing out the numbers in Microsoft word to the different fonts used. These were then expanded so each number occupied an entire page (11 by 8.5 inches). The MS Word document was then converted to individual bitmap images and imported into MATLAB to create digital image libraries of sizes 200 by 150 pixels.

The arithmetic sum added up the numerical ranks for the particular target number as adjudged by each fusion rule. The unknown sample (score images) was classified to the number digit with the lowest values in both instances (1 for majority vote and minimum value for sum). Tables 8 and 9, below, show the results for the identification of the defaced numbers on the gun barrel (numbers 1 and 2 respectively). From these tables, the consensus results positively matched the defaced numbers to the respective reference library images.

TABLE 8

| | Target Number | | | | | | | | | |
|---|---|---|---|---|---|---|---|---|---|---|
| | 0 | 1 | 2 | 3 | 4 | 5 | 6 | 7 | 8 | 9 |
| Majority vote | 5 | 1 | 8 | 3 | 9 | 2 | 7 | 10 | 4 | 6 |
| Sum | 70 | 20 | 112 | 42 | 126 | 28 | 98 | 140 | 56 | 84 |

TABLE 9

| | Target Number | | | | | | | | | |
|---|---|---|---|---|---|---|---|---|---|---|
| | 0 | 1 | 2 | 3 | 4 | 5 | 6 | 7 | 8 | 9 |
| Majority vote | 3 | 9 | 1 | 6 | 10 | 2 | 5 | 7 | 4 | 8 |
| Sum | 42 | 124 | 14 | 80 | 140 | 28 | 74 | 98 | 56 | 114 |

Example 4

Figure 27:
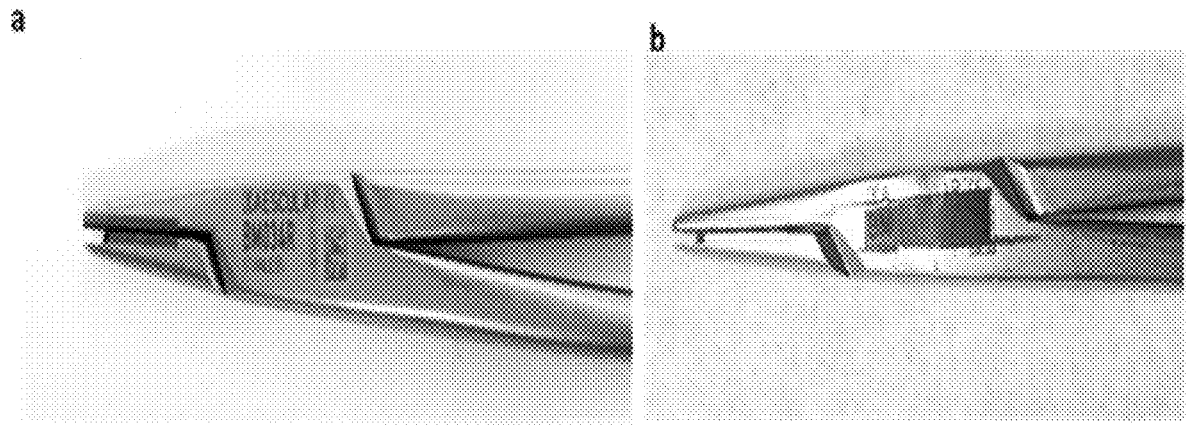
FIG. 27 presents an image of an Aesculap® needle holder with a) Laser engraved numbers and b) numbers defaced and painted with India ink.

To test the efficacy of the method on laser engraved samples, a laser engraved Aesculap® surgical needle holder (Model BM034R) was obtained. Two of the laser-engraved numbers were filed to simulate defacing serial numbers. FIG. 27 shows the needle holder before (a) and after (b) the characters were removed.

The surface was prepared, and data was collected as described in Example 1, above. For the samples in this study, images are collected over 16 pulse cycles. Testing was extended from the 0.5 Hz of Example 1 to four modulation frequencies. These frequencies were 1 Hz, 0.125 Hz, 0.05 Hz, and 0.03125 Hz corresponding to 1 second, 8 seconds, 20 seconds, and 32 second pulse cycle times respectively. The setup was adjusted with the camera field of view focused to capture areas over two of the removed numbers. Each dataset of thermal images captured was then digitally split to have datasets that are focused on the areas around each defaced number.

The same process as described above was replicated with thermal energy pulsed at four modulation frequencies, 1 Hz, 0.125 Hz, 0.05 Hz, and 0.03125 Hz, and PCA carried out on the amplitude and phase images of each of the four cycles independently. Score images developed from the phase images and amplitude images were inspected to determine which set best captured the thermal gradient in the heat affected zone to characterize the defaced number. This proved to be the amplitude score images at all four modulation frequencies for the defaced number 0 and amplitude score images for frequencies 1 Hz, 0.125 Hz, and 0.05 Hz, and the phase score images for 0.03125 Hz for the defaced number 3.

Figure 28:
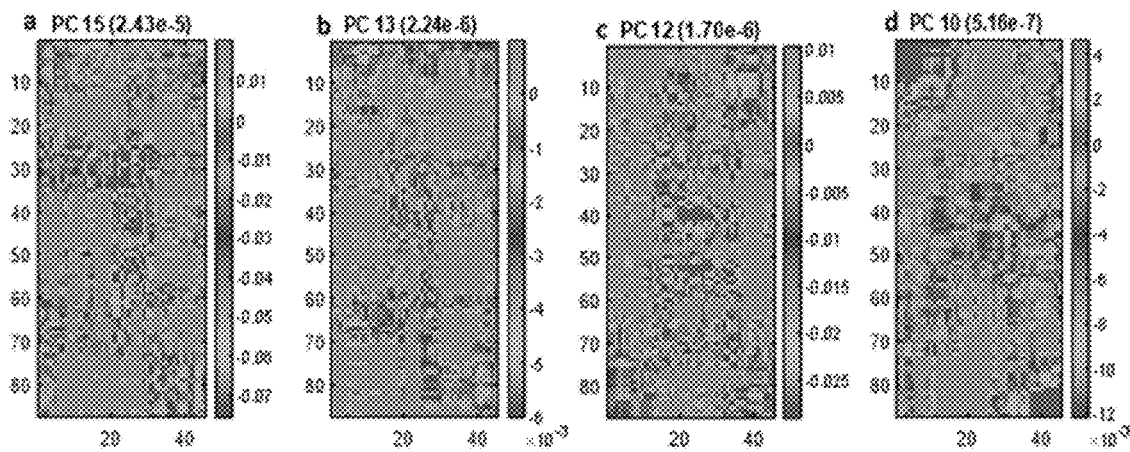
FIG. 28 presents needle holder score images of defaced area around 0 at a) 1 Hz, b) 0.125 Hz, c) 0.05 Hz, and d) 0.03125 Hz.
Figure 29:
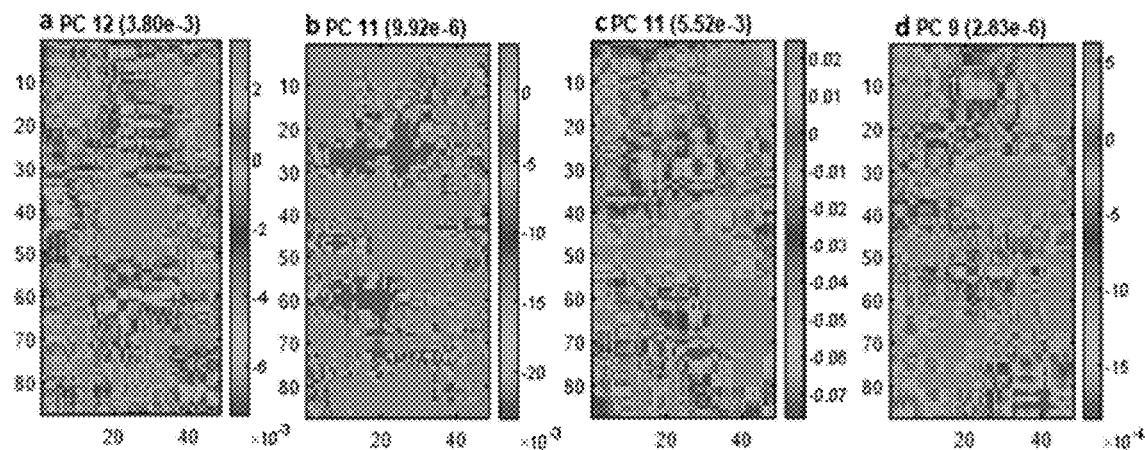
FIG. 29 presents needle holder score images of defaced area around number 3 at a) 1 Hz, b) 0.125 Hz, c) 0.05 Hz, and d) 0.03125 Hz.

FIG. 28 shows the score images of the defaced number 0, for the four modulation frequencies. These score images were selected as those with the best visual representation of the number removed from the area. FIG. 29 similarly shows the score images from different modulation frequencies for the defaced number 3.

As with the gun barrel, score images with the recovered digits are at higher PCs explaining small amounts of variance for the four pulsing frequencies. From the results, it was again be inferred that all four modulation frequencies adequately captured the thermal gradient changes.

The number identification protocol used was similar to that described in Example 2, including the use of pseudo Zernike moments in feature extraction and application of the similarity measures and fusion rules described above. Tables 10 and 11, below, show the results of obtaining a consensus of all the resulting fusion values for the defaced numbers on the laser engraved needle holder (numbers 0 and 3 respectively).

TABLE 10

| | Target Number | | | | | | | | | |
|---|---|---|---|---|---|---|---|---|---|---|
| | 0 | 1 | 2 | 3 | 4 | 5 | 6 | 7 | 8 | 9 |
| Majority vote | 1 | 2 | 6 | 4 | 7 | 3 | 8 | 10 | 5 | 9 |
| Sum | 14 | 30 | 84 | 56 | 104 | 40 | 106 | 140 | 70 | 126 |

TABLE 11

| | Target Number | | | | | | | | | |
|---|---|---|---|---|---|---|---|---|---|---|
| | 0 | 1 | 2 | 3 | 4 | 5 | 6 | 7 | 8 | 9 |
| Majority vote | 5 | 6 | 2 | 1 | 9 | 3 | 8 | 10 | 4 | 7 |
| Sum | 74 | 80 | 30 | 18 | 126 | 42 | 112 | 140 | 50 | 98 |

Example 5

Figure 30:
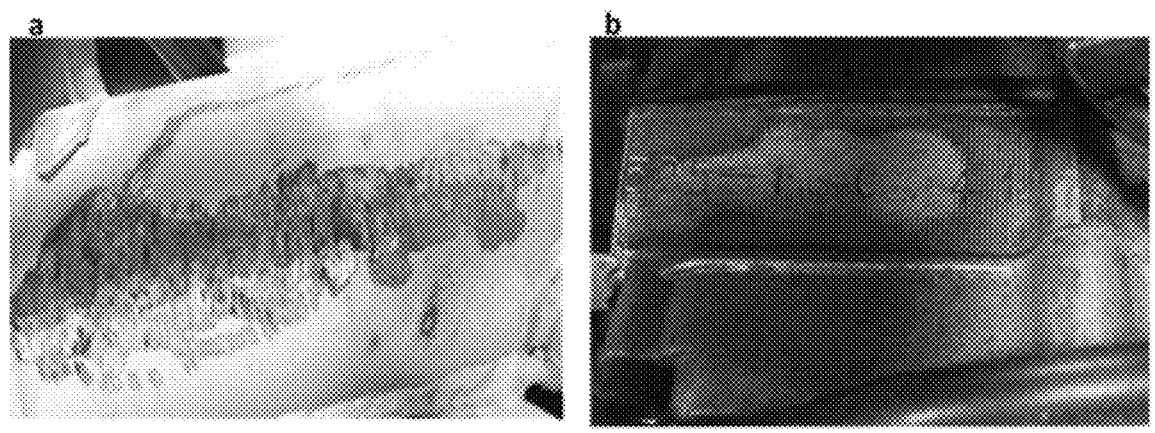
FIG. 30 presents at a) an image of a defaced VIN on motorcycle fork and at b) an image of the VIN on the motorcycle engine with most numbers still intact.

A recovered Yamaha model TY175 motorcycle with the VIN defaced on the fork ostensibly to prevent identification was obtained from the Idaho Power County sheriff's department for use to test the process. The motorcycle's defaced VIN on the fork is presented in FIG. 30. This specimen had the VIN completely removed (a) but the VIN stamped into the engine block (b) only had a few of the numbers defaced and was used to confirm the numbers delineated in the score images of the fork. This verification process assumed the engine block and fork are original and thus, the numbers on them were the same.

The surface was prepared, and data was collected as described in Example 1, above. For the samples in this study, images were collected over 16 pulse cycles. Testing was extended from the 0.5 Hz of Example 1 to four modulation frequencies. These frequencies were 1 Hz, 0.125 Hz, 0.05 Hz, and 0.03125 Hz corresponding to 1 second, 8 seconds, 20 seconds, and 32 second pulse cycle times respectively. Due to size and shape constraints, it was not possible to use the same setup as above for the motorcycle fork. Therefore, heating tape was wrapped around the fork in lieu of the hot plate and used to heat the fork up to an initial temperature of approximately 70° C. which although not entirely even over the entire area, proved adequate for the experiments.

An initial challenge was to narrow down the locations of the stamped fork numbers, as it was not possible to identify the exact location of the defaced numbers. To narrow down the locations, the entire defaced area was divided into three sections as shown in FIG. 31, and each section analyzed to possibly recover some of the defaced numbers and use that as a guide to pinpoint the location of the defaced numbers.

From the still intact numbers on the engine block, it was determined that the VIN numbers were 5-2-5-1-[ ]-0-[ ]-4-1 with the square brackets indicating the completely defaced numbers. Knowledge of some of the serial numbers allowed for the evaluation of the identification process using only the defaced fork numbers.

An initial assessment of each section was carried out using the LIT and PCA processes as described above to investigate the possibility of locating regions where a number may have been and use this as a template to locate the positions of other numbers in the area.

Figure 31:
FIG. 31 illustrates defaced motorcycle fork painted with India ink (white lines demarcate the sections individually imaged and analyzed).
Figure 32:
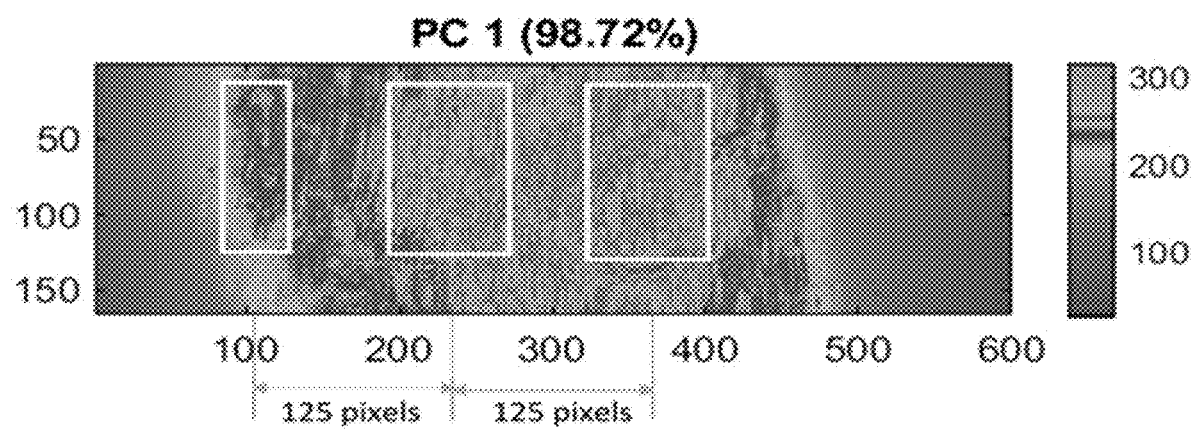
FIG. 32 presents a motorcycle fork score image of the middle section in FIG. 31 showing some defaced number locations.

A score image of the initial assessment of the middle section in FIG. 31 is shown in FIG. 32. This score image shows what appeared to be parts of numbers that were not fully defaced allowing for their locations to be identified. The center to center distance between each of the possible numbers was determined for use as a guide to the possible positions of the other numbers. This distance was approximately 125 pixels wide. The bounded regions (white boxes in FIG. 31) were extracted from the dataset and independently re-analyzed by PCA to characterize the local zones of plastic strain and recover the defaced numbers within.

Figure 33:
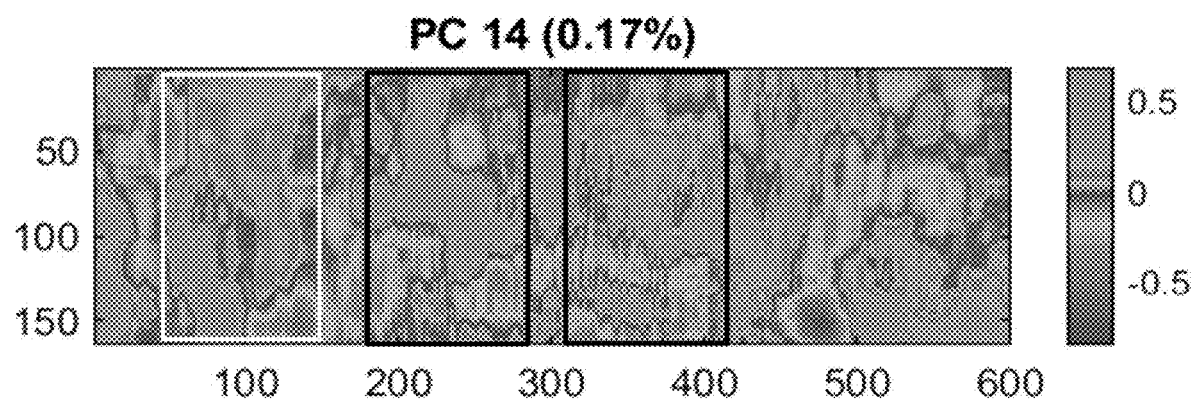
FIG. 33 presents a motorcycle fork score image of the first section in FIG. 31 showing a possible number (white box) and other areas (dark boxes) with possible numbers.

A PCA assessment of the first section produced an area in a PC score image that could conceivably be identified as the zone of plastic strain beneath a defaced number. This area was extracted as a region of interest within the bounds of the white box shown on the image in FIG. 33 and re-analyzed independently. The center to center distance previously determined from the assessment of the middle section was used to determine the center of the next two numbers in the image to form the regions of interest (dark boxes in FIG. 33) to also be re-analyzed independently by PCA.

Figure 34:
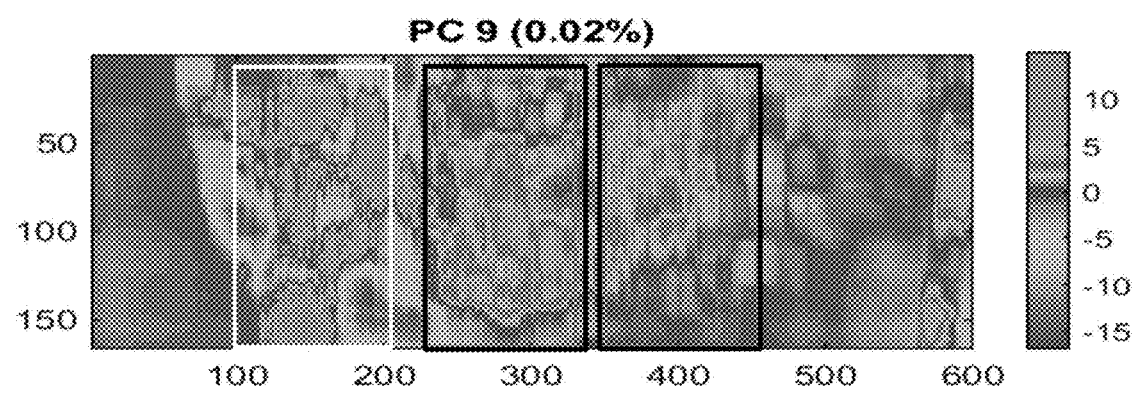
FIG. 34 presents a motorcycle fork score image of a section of defaced area showing a possible number (white box) and other localized areas (dark boxes).

The initial PCA assessment of the third section from FIG. 31 can be seen in FIG. 34. A characteristic shape that may represent a local zone of plastic strain was identified and the region of interest localized (white box in FIG. 34). This localized area was used to determine the possible locations of other numbers in this section (dark boxes in FIG. 34) via the center to center distance determined from the defaced numbers in FIG. 32.

Figure 35:
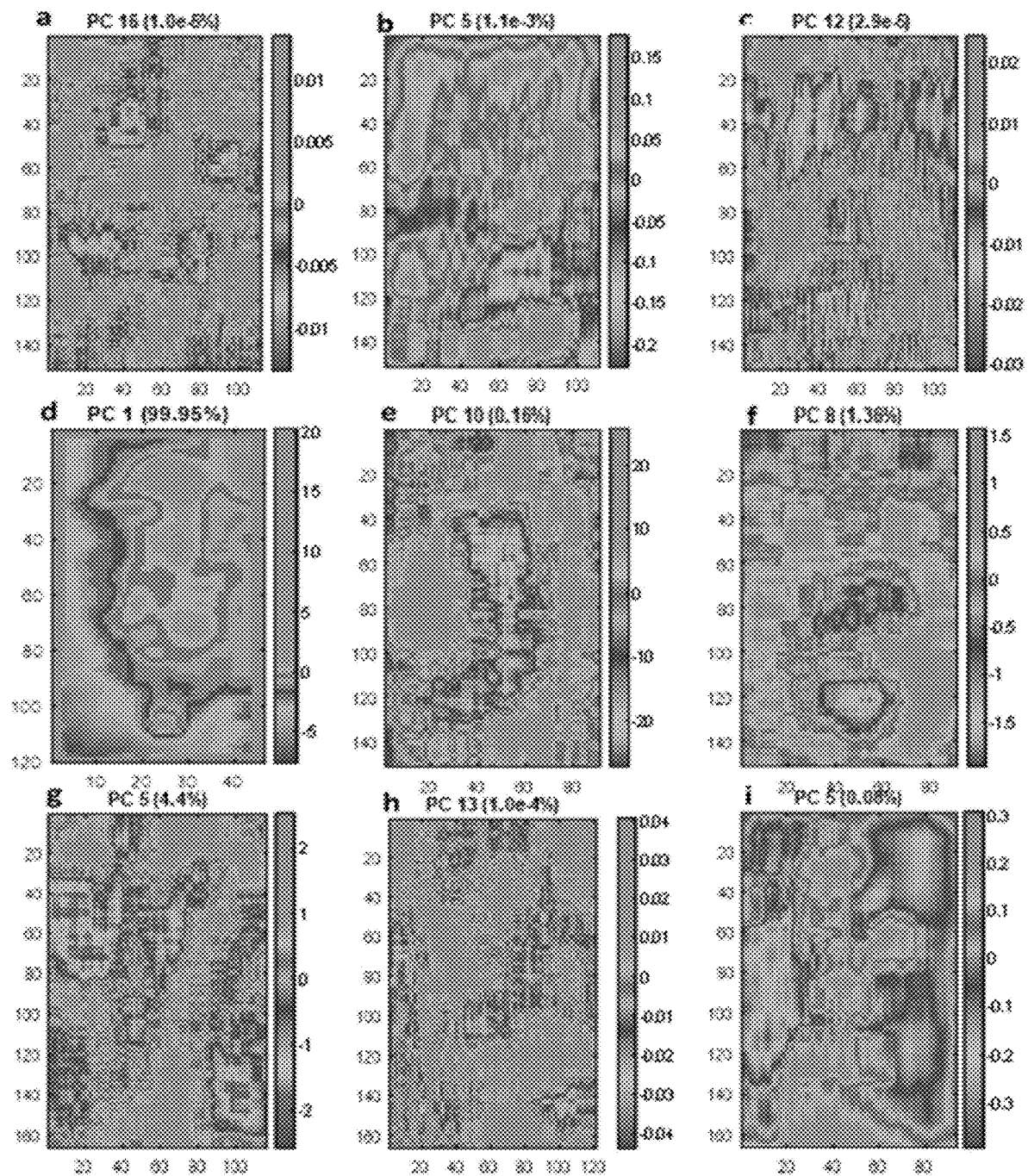
FIG. 35 presents motorcycle fork score images showing recovered VIN numbers and the modulation frequency used in the thermal imaging step: a) 5 (0.03125 Hz), b) 2 (0.03125 Hz), c) 5 (0.03125 Hz), d) 1 (0.05 Hz), e) unknown (0.05 Hz), f) 0 (0.05 Hz), g) unknown (0.05 Hz), h) 4 (0.05 Hz), i) 1 (0.05 Hz).

Each of the localized regions of interest were independently analyzed using PCA to characterize and enhance the local thermal gradients around the defaced numbers. FIG. 35 shows the score images for the different areas. These images selected by visual inspection of all the 16 score images developed for each local region of interest across each of the four modulation frequencies (a total of 64 comparisons) showed enough detail to mark out a possible number. As with the gun barrel and needle holder, only one score image showed enough of such details with the other score images partially characterizing the number. These score images showing details of the defaced number were usually among the higher PC score images detailing how small the changes in thermal gradient are due to thermal conductivity differences within these regions. The following are the known stamped numbers from the engine block, the numbers also defaced on the engine block are labeled unknown:

a) 5 (0.03125 Hz),
b) 2 (0.03125 Hz),
c) 5 (0.03125 Hz),
d) 1 (0.05 Hz),
e) unknown (0.05 Hz),
f) 0 (0.05 Hz),
g) unknown (0.05 Hz),
h) 4 (0.05 Hz),
i) 1 (0.05 Hz)

Similar to the gun barrel and needle holder, thermal images collected at all four modulation frequencies captured enough of the thermal gradient to characterize the zone of plastic strain allowing for possible recovery of the defaced numbers. However, due to the differing depths of defacing, there were slight differences in the quality of the characterized zone of plastic strain.

From the score images of the defaced areas, PCA appeared to capture the variation in thermal gradient within the zones of plastic strain and heat affected zones, characterizing them into the score images. However, the small changes in thermal gradient between defaced regions and clean non-defaced regions, as well as general surface conditions from defacing the serial numbers reduced the quality of the score images and made visual recognition of the numbers difficult.

The number identification protocol used was similar to that described in Example 2, including the use of pseudo Zernike moments in feature extraction and application of the similarity measures and fusion rules described above. Table 12 shows the results of the consensus of identification for the defaced numbers on the motorcycle fork. Shown in this table are the target reference library numbers that were matched to the score images of each of the defaced areas. Comparing these results to the known numbers from the engine block, it can be seen that the defaced serial numbers were accurately identified.

TABLE 12

|  | Target Number | | | | | | | | |
| --- | --- | --- | --- | --- | --- | --- | --- | --- | --- |
|  | 5 | 2 | 5 | 1 | 0 | 0 | 7 | 4 | 1 |
| Majority vote | 1 | 1 | 1 | 1 | 1 | 1 | 1 | 1 | 1 |
| Sum | 16 | 16 | 14 | 14 | 14 | 16 | 22 | 20 | 18 |

While certain embodiments of the disclosed subject matter have been described using specific terms, such description is for illustrative purposes only, and it is to be understood that changes and variations may be made without departing from the spirit or scope of the subject matter.

What is claimed is:

1. A computer-implemented non-destructive method for identifying a defaced mark in a metal surface comprising:
   obtaining a plurality of infrared thermal images of a defaced area on a metal surface according to a lock-in thermal imaging technique;
   developing, by a computing system comprising one or more computing devices, a plurality of input images from the plurality of infrared thermal images, the input images comprising phase images, amplitude images or a combination thereof;
   developing, by the computing system, a plurality of score images from the plurality of input images, each score image being a reconstruction into an image of a single principal component;
   applying, by the computing system, a plurality of similarity measures to one or more of the plurality of score images and to each of a plurality of reference images to obtain a plurality of similarity values for each of a plurality of possible identities of the defaced mark; and
   assigning, by the computing system, an identity to the defaced mark based upon the similarity values.

2. The computer implemented method of claim 1, the lock-in thermal imaging technique comprising obtaining the plurality of infrared thermal images at a plurality of modulation frequencies.

3. The computer implemented method of claim 1, the step of developing, by the computing system, the plurality of input images comprising a two-channel image correlation process and/or comprises inverting an in-phase signal and a quadrature signal.

4. The computer implemented method of claim 1, the step of developing, by the computing system, the plurality of score images comprising principal component analysis of an input matrix, the input matrix comprising a collection of input image matrices.

5. The computer implemented method of claim 4, the collection of input image matrices comprising a collection of phase image matrices or a collection of amplitude image matrices.

6. The computer implemented method of claim 1, wherein the plurality of similarity measures is applied, by the computing system, to fewer than all of the plurality of score images.

7. The computer implemented method of claim 6, wherein the plurality of similarity measures is applied, by the computing system, to only a single score image.

8. The computer implemented method of claim 1, further comprising extracting, by the computing system, via orthogonal moments, a plurality of features from the one or more score images and from each of the plurality of reference images, the plurality of similarity measures being applied, by the computing system, to the extracted features.

9. The computer implemented method of claim 8, wherein the extracted features comprise Zernike moments or pseudo Zernike moments.

10. The computer implemented method of claim 9, wherein the Zernike moments comprise from about 10 to about 50 Zernike basis polynomials.

11. The computer implemented method of claim 1, the similarity measures comprising from about 5 to about 20 similarity measures.

12. The computer implemented method of claim 1, the similarity measures comprising one or more correlation coefficients, one or more Euclidean distances, one or more angles, a determinant, one or more unconstrained Procrustes analyses, one or more constrained Procrustes analyses, one or more Mahalanobis distances, or any combination thereof.

13. The computer implemented method of claim 1, further comprising fusing, by the computing system, the similarity values for each of the possible identities of the defaced mark.

14. The computer implemented method of claim 13, the step of fusing, by the computing system, the similarity values for each of the possible identities of the defaced mark comprising application of one or more data fusion rules to the similarity values.

15. The computer implemented method of claim 14, the data fusion rules comprising sum, geometric mean, harmonic mean, median, L2 norm, L1 norm, truncated geometric mean, truncated harmonic mean, or any combination thereof.

16. The computer implemented method of claim 15, the data fusion rules incorporating raw values, rank values, or combinations thereof.

17. The computer implemented method of claim 13, further comprising ranking, by the computing system, the fused similarity values for each of the possible identities of the defaced mark.

18. The computer implemented method of claim 17, the ranking comprising a majority vote ranking or a sum rule ranking.

19. The computer implemented method of claim 18, the ranking comprising both a majority vote ranking and a sum rule ranking.

20. A computer-implemented non-destructive method for identifying a defaced mark in a metal surface comprising:
  obtaining at each of a plurality of modulation frequencies, a plurality of infrared thermal images of a defaced area on a metal surface according to a lock-in thermal imaging technique;
  developing, by a computing system comprising one or more computing devices, a plurality of input images from the plurality of infrared thermal images, the input images comprising phase images, amplitude images or a combination thereof;
  developing, by the computing system, a plurality of input matrices, each input matrix comprising a concatenated collection of a plurality of input images;
  carrying out a principal component analysis of each input matrix;
  developing, by the computing system, a plurality of score images from each input matrix, each score image being a reconstruction into an image of a single principal component obtained through the principal component analysis of each input matrix;
  extracting, by the computing system, a plurality of features from each of the score images, the extracted features comprising Zernike moments or pseudo Zernike moments;
  applying, by the computing system, a plurality of similarity measures to the extracted features of the plurality of score images and to similar extracted features from each of a plurality of reference images to obtain a plurality of similarity values for each of a plurality of possible identities of the defaced mark;
  fusing, by application of one or more data fusion rules by the computing system, the similarity values for each of the possible identities of the defaced mark;
  ranking, by the computing system, the fused similarity values according to a majority vote ranking rule and a sum ranking rule; and
  assigning, by the computing system, an identity to the defaced mark based upon the ranking.

* * * * *